United States Patent [19]
Boothroyd et al.

[11] Patent Number: 4,884,199
[45] Date of Patent: Nov. 28, 1989

[54] USER TRANSACTION GUIDANCE

[75] Inventors: William A. Boothroyd, Davidson, N.C.; James C. Camann, Fort Mill, S.C.; Robert A. Palo, Concord, N.C.

[73] Assignee: International Business Macines Corporation, Armonk, N.Y.

[21] Appl. No.: 20,796

[22] Filed: Mar. 2, 1987

[51] Int. Cl.$^4$ ............................................. G06F 15/30
[52] U.S. Cl. ..................................... 364/408; 235/379
[58] Field of Search ........................ 364/408; 235/379; 340/724, 742

[56] References Cited

U.S. PATENT DOCUMENTS

| | | | |
|---|---|---|---|
| Re. 30,733 | 10/1981 | Glaser et al. | 235/379 |
| 3,876,864 | 4/1975 | Clark et al. | 235/61.7 B |
| 4,423,316 | 12/1983 | Sano et al. | 235/379 |
| 4,438,326 | 3/1984 | Uchida | 235/379 |
| 4,663,617 | 5/1987 | Stockwell | 340/724 |
| 4,670,752 | 6/1987 | Marcoux | 340/724 |
| 4,680,643 | 9/1987 | Horiguchi | 340/724 |
| 4,689,616 | 8/1987 | Goude et al. | 340/724 |
| 4,694,288 | 6/1987 | Harada | 340/724 |

OTHER PUBLICATIONS

"Video Display Processor Simulates Three Dimensions", Karl Guttag et al., 1980; pp. 123–126.
"Video Display Processor", Karl M. Guttag et al., Feb. 1981, pp. 27–34.
Michael Abrash and Dan Illowsky, "Software Sprites", Aug. 1986, PC Tech Journal, pp. 125–157.
Michael Abrash and Dan Illowsky, "Animation Techniques", Jul. 1986, PC Tech Journal, pp. 47–71.
"Creating a History of People and Machines", a company profile of the Omron Tateisi Electronics Co.

Primary Examiner—Charles E. Atkinson
Assistant Examiner—Kim Thanh Tbui
Attorney, Agent, or Firm—Karl O. Hesse

[57] ABSTRACT

A user guidance display system provides an animated display of example action being entered into a displayed image of the machine, to show a self-service machine user how the machine is to be operated. The various graphic images which show the prospective user what to do are created on a personal computer, using any of the commercially available graphic design programs. The binary file provided by the design program is processed, to compress the file into a special form having reduced memory requirements and having synergism with the image-displaying apparatus so as to permit fast and low overhead display of each image. By displaying a base image comprised of a number of image fragments, the base image can be changed during the course of guiding a user through a transaction. Animation is provided by sequentially displaying a plurality of image fragments under control of an animation list which, in turn, controls a timer. In order to provide for the convenient combination of graphic images and text, each image fragment is referenced to a text character location. The picture fragments, after being compressed, are stored in a memory in the self-service transaction machine. Text and picture images are sent to the display as messages under control of the transaction program executing in the computer of the self-service transaction machine. The messages are in the form of standard character strings in which a special graphic escape control code has been defined to distinguish between character text codes and graphic image fragment display instructions.

9 Claims, 23 Drawing Sheets

SCS STRING:

| GRAPHICS ESCAPE | ABSOLUTE POSITION CODE | PICTR ID | ABSOLUTE POSITION CODE | PICTR ID | | RETURN TEXT MODE |

LITERALLY:

| ATTRIBUT 28 43 10 | POSITION HORIZONL 34 00 XX | POSITION VERTICAL 34 04 YY | PICTR ID | POSITION HORIZONL 34 00 XX | POSITION VERTICAL 34 04 YY | PICTR ID |

| POSITION VERTICAL 34 04 YY | PICTR ID | | TEXT MODE 28 43 20 | ABSOLUTE POSITION CODE |

ID 41

ID 42

ID 43

ID 44

ID 45

ANIMATION LIST

| DIRECTORY LOCATION | DIRECTORY CONTENT | | | |
|---|---|---|---|---|
| | CONTROL | SHOW | NEXT | TIME |
| A1 | 80 | 41 | A2 | 05 |
| A2 | 80 | 42 | A1 | 05 |
| A3 | 80 | 05 | A4 | 0A |
| A4 | 80 | 43 | A5 | 05 |
| A5 | 80 | 46 | A6 | 00 |
| A6 | 80 | 05 | A7 | 00 |
| A7 | 80 | 06 | A8 | 00 |
| A8 | 80 | 07 | A9 | 00 |
| A9 | 80 | 44 | AA | 05 |
| AA | 80 | 46 | AB | 00 |
| AB | 80 | 05 | AC | 00 |
| AC | 80 | 06 | AD | 00 |
| AD | 80 | 07 | AE | 00 |
| AE | 80 | 45 | AF | 05 |
| AF | 80 | 46 | B1 | 00 |
| B1 | 80 | 06 | B2 | 00 |
| B2 | 80 | 07 | A3 | 00 |

USER TRANSACTION GUIDANCE

FIELD OF THE INVENTION

This invention relates to a method and apparatus for controlling the display of stored images so as to efficiently and effectively guide a person using a self-service transaction device such as an automatic teller machine.

BACKGROUND OF THE INVENTION

The use of self-service transaction machines to obtain cash after bank hours, purchase airline tickets, check into or out of a hotel room, and the like has grown dramatically in recent years. It also has been learned in recent years that a certain segment or percentage of the population exhibits a high degree of resistance to using self-service transaction machines. Each of these persons has their own individual reasons for insisting on dealing with a human teller, reservation agent, or hotel clerk but, in some cases, it is also likely that the instruction provided for the operation of a self-service transaction machine do not effectively show a prospective user how to use the machine. The known technique of displaying instruction text on a cathode ray tube adjacent to function keys may not always effectively guide a prospective user. The difficulty in communicating with a prospective user is increased by special circumstances such as a user who wears glasses, a user who lacks knowledge of specialized terms used in the transaction, and so forth. As a result a user may be intimidated by the large number of keys and switches and apertures to be actuated. The prior art includes an automatic banking machine which includes a video camera and microphone connection between a user of the self-service terminal and an assistance operator located at a central office. Through these video and audio communications between the assist operator and the user, the assist operator can assist the user through step-by-step personal guidance to acquaint the user with the required transaction procedure. This solution to the user guidance problem is expensive in that video cameras and audio connections must be installed into the teller machine or in the immediate vicinity, and a human operator must remain on duty for the system to be effective. It is also human nature to dislike being corrected by another person, who in order to help must know what the user has entered or failed to enter.

Graphic pictures of an ID card or cash have also been affixed to the console of a transaction machine to guide a user. Such static graphics do not indicate when the pictured item is to be provided or taken by the user. Graphic pictures of these same items when displayed on a CRT screen at the proper time do indicate when the action is to take place but not where and how and their display is often slow unless special hardware is provided. Such guidance often becomes interfering in the sense that it is not fast and accurate and so tends to frustrate those prospective users who have a high degree of skill and knowledge in the use of such transaction machines.

SUMMARY OF THE INVENTION

The present invention provides an efficient animated display of graphic images to assist the prospective user to focus on a required action and to focus on that portion of the machine where user action is required. The speed and efficiency of the graphics presentation provides the ability for the machine to show how it is to be operated by example action being entered into an image of the self-service transaction machine which is being displayed. The various graphic images which show the prospective user what to do are created on a personal computer, using any of the commercially available graphic design programs which run on personal computers and generate a binary file of the graphic image which was created at the personal computer. In this way, the owner of the self-service transaction machine can readily create new graphic images to provide an interesting and attractive appearance of the self-service transaction machine to the public. The binary file is processed, to compress the file into a special form, having reduced memory requirements and having synergism with the image-displaying apparatus so as to permit fast and low overhead display of each image. By displaying a base image comprised of a number of image fragments, the base image can be conveniently changed during the course of guiding a user through a transaction. Change of the image is accomplished by the same computer which controls the self-service transaction machine, avoiding the need for more costly, special purpose graphic display hardware. Animation is provided by sequentially displaying a plurality of image fragments under control of an animation list which, in turn, controls a timer. In order to provide for the convenient combination of graphic images and text, each image fragment is referenced to a text character location. The picture fragments, after being compressed, are stored in a memory in the self-service transaction machine. Text and picture images are sent to the display under control of the transaction program executing in the computer of the self-service transaction machine. The display of text and graphics fragments is controlled by messages from a transaction program. The messages are in the form of standard character strings in which a special graphic escape control code has been defined to distinguish between character text codes and graphic image fragment display instructions.

It is a feature of this invention to improve the effectiveness of communication between a self-service transaction machine and prospective users having a wide range of skill and ability and specialized knowledge.

It is an advantageous effect of this invention that animated images which show, by way of example, how a prospective user should interact with the machine, can be quickly and efficiently displayed to the prospective user without substantially increasing the cost of the machine.

It is another advantageous effect of the invention that images in the form of picture fragments are compressed so as to be efficiently stored and synergistically displayed using a minimum number of computer cycles and no special hardware.

It is a still further advantageous effect of the method and apparatus of this invention that the computer which controls the self-service transaction machine can, by way of a standard character string, display both text and animated images on a raster cathode ray tube display.

A still further advantage of the invention lies in its ability to utilize binary image files created on a personal computer by any of a number of commercially available programs, thereby permitting the owner of the transaction machine to readily and economically change the images in order to tailor the guidance to changing conditions, seasons of the year, or special groups of prospective users.

These and other features and advantageous effects of the invention will become apparent to the reader from the following detailed description when taken in conjunction with the accompanying drawings.

THE DESCRIPTION OF THE PREFERRED EMBODIMENT

Figures 1, 6:
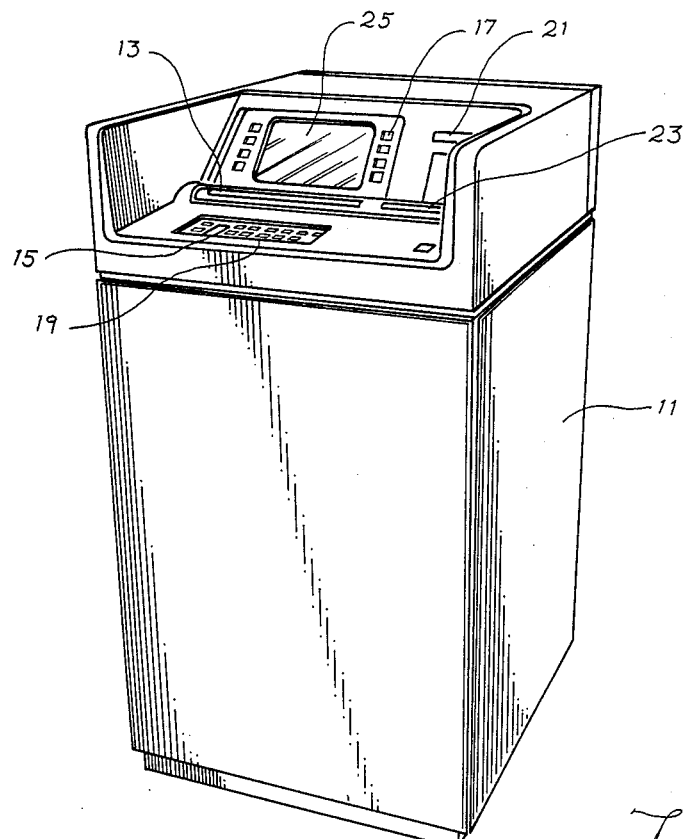
FIG. 1 shows a prospective view of an automatic teller machine in which the invention finds utility.
FIG. 6 shows the format of the graphics attribute and control bytes in the standard character string.

FIG. 1 shows a perspective view of a self-service transaction machine in the form of an automatic teller machine for performing financial transactions. The machine includes a base assembly 11 having a plurality of cartridges, each storing a different denomination of bank notes. Upon command from a microcomputer, the cartridges feed bills one at a time to an escrow area within assembly 11 in preparation for dispensing to the user through aperture 13. The user causes the proper denominations and amounts of currency to be dispensed by entering information at function keys 15 and 17 in response to guidance messages displayed in the language of the user at cathode ray tube display 25, all under control of the microprocessor shown in FIG. 2. A transaction is initiated when the user inserts an identification card into aperture 21 which leads to a magnetic stripe card reader. After reading the card, the microcomputer requests that the user enter a personal identification number at numeral key pad 19 in order to verify the identity of the holder of the card.

Figure 2:
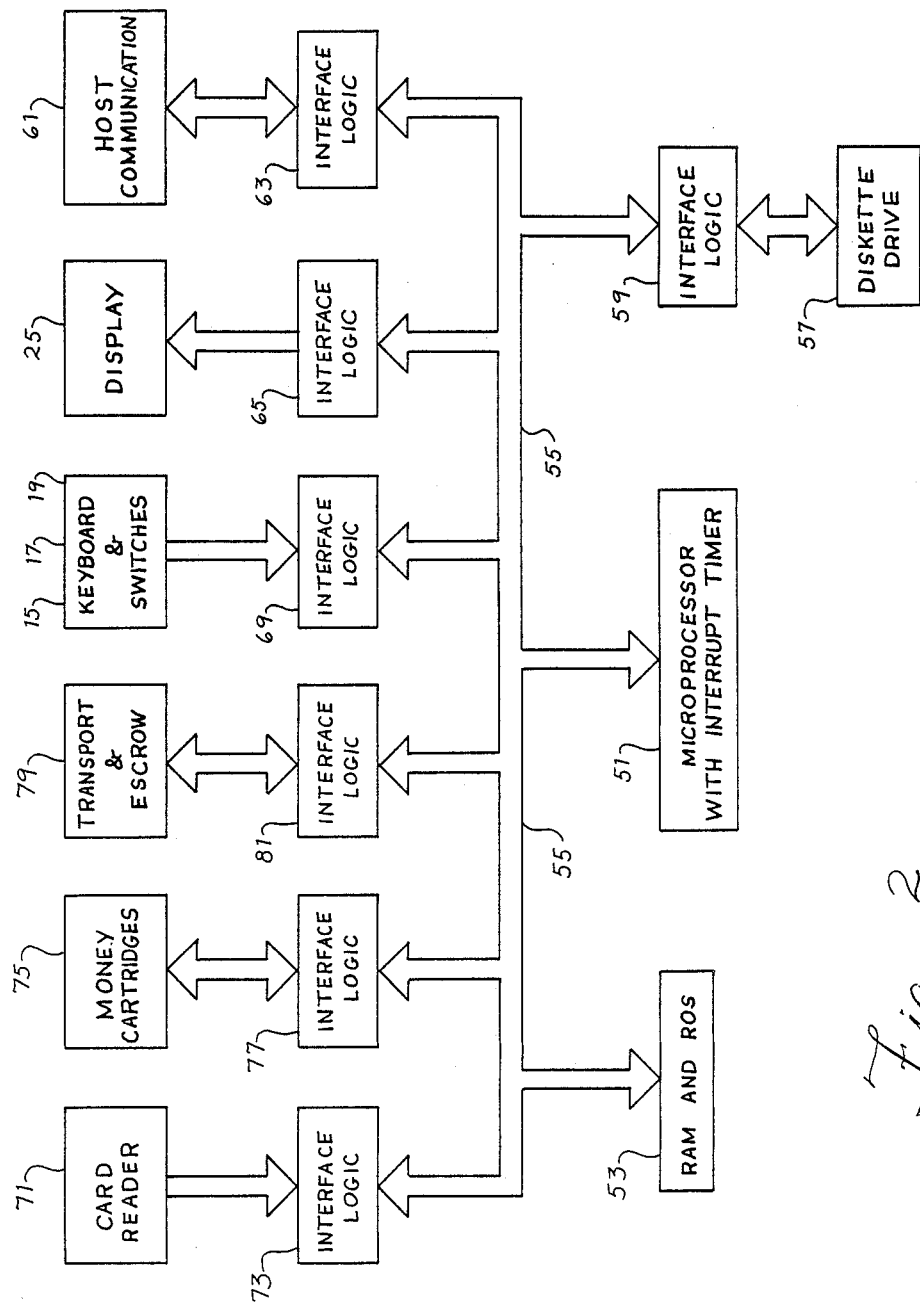
FIG. 2 shows a block diagram of the system hardware of the machine of FIG. 1.

Referring now to FIG. 2, a block diagram of the system hardware is shown. Substantially all of the hardware is controlled by microprocessor 51 which has an internal interrupt timer. The microprocessor uses read only program storage and random access memory 53 to control transactions being executed by the self-service transaction machine, and to control the various hardware items that make up the machine. In addition to storage 53, microprocessor 51 is able to read programs, as well as read and write data from and to diskette drive 57 by way of interface logic 59 over the interconnect bus 55. Likewise, information is transmitted over a communication network to and from one or more host computers via communication modem 61 connected by interface 63. The self-service transaction machine communicates to a user by way of cathode ray tube display 25 and interface 65. The transaction machine receives input from the user by way of keyboards and switches 15, 17 and 19, connected through interface 69. In addition, card reader 71, which is mounted behind aperture 21, is controlled by interface 73 to read a potential user's identification card. Money is issued from money cartridges 75, containing the same or different denominations, under control of commands from microprocessor 51 passed through interface logic 77. After the money has been issued and counted, bill by bill, it is transported and escrowed by mechanical units 79 under control of the microprocessor through interface logic 81.

Although additional machine features can be included in the self-service transaction machine and controlled in the same manner, they are not shown here in the interest of clarity. Such features might include a magnetic ink character reader or a depository.

Figure 3:
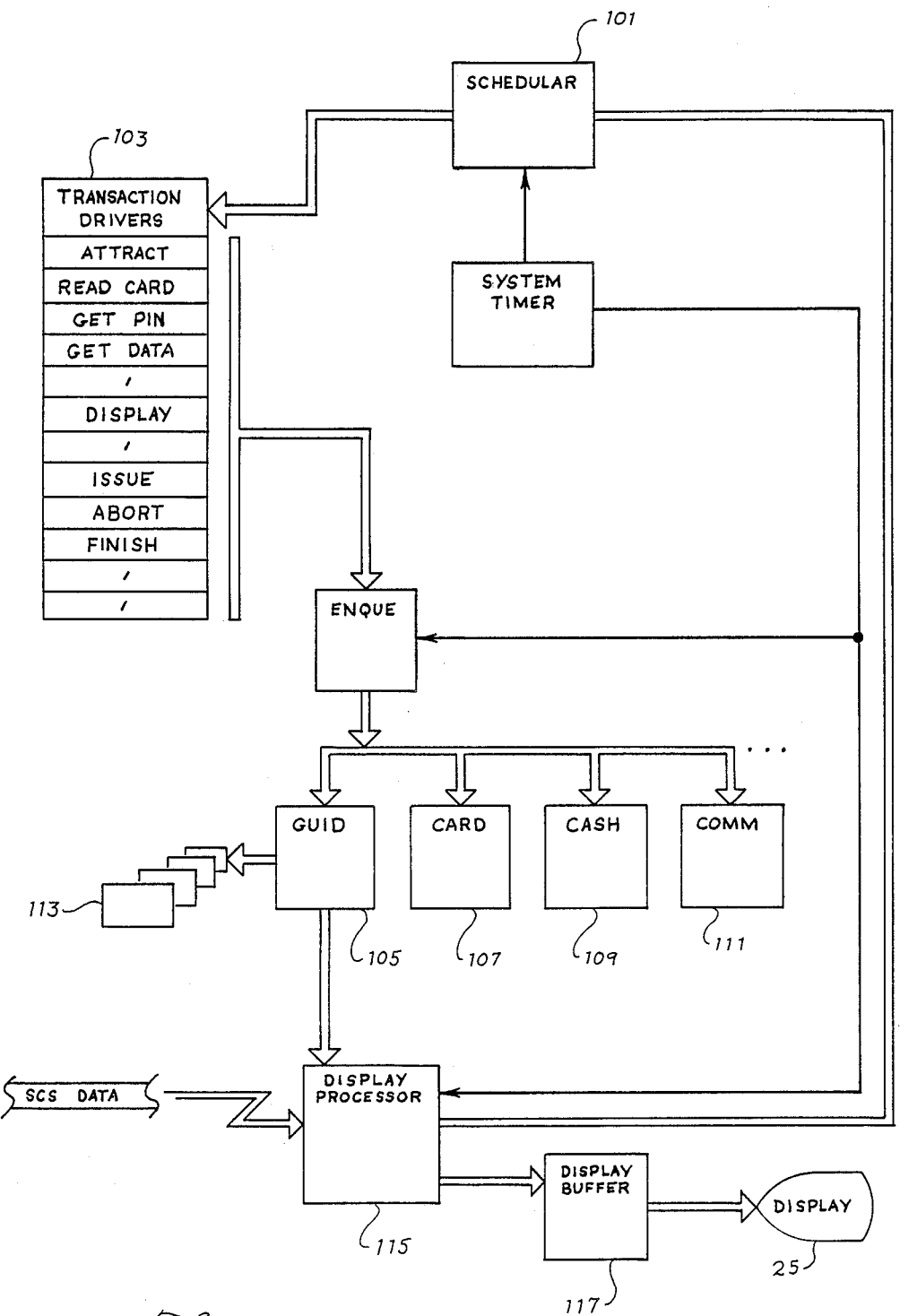
FIG. 3 is a high level block diagram of the programs which are stored in storage 53 and control the machine.

Referring now to FIG. 3, a block diagram of the operating system and transaction control programs that execute within the microprocessor 51 to control the self-service transaction machine will be described.

A scheduler 101 is the focal point of distributing transaction tasks to be completed to the hardware of the machine in a priority sequence in order to accomplish the transactions that have been selected by the machine user. Block 103 includes a plurality of program modules, each module defining the logic for a particular machine state. They include the attract mode in which the machine continually displays a message to passersby inviting them to use the self-service transaction machine. Other modes like read card are selected by the scheduler for execution when stimuli is received from a user. For example, when a card is placed in card read slot 21, a sensor at the throat of the card reader detects the presence of the magnetic stripe and the width of the card to indicate that an ID card is present. This, in turn, causes the scheduler to invoke the read card module. Other states, such as get Personal Identification Number (PIN), get data, authorize, etc., are in turn invoked by the scheduler to complete a transaction, such as transfer cash from savings to checking, which has been selected by the transaction machine user.

Of special interest is the display mode of operation which is the mode of operation of the transaction machine being described in which the instant invention finds utility. The display is a cathode ray tube 25 which is driven by an IBM Personal Computer Color Graphics Adapter Card set up in medium graphics mode that is 320 picture elements wide and 200 picture elements tall. The cathode ray tube is continually refreshed from a display buffer which is part of random access memory 53. Transfer of data from the memory 53 buffer area to the cathode ray tube occurs in direct memory access mode therefor operating asynchronous microprocessor 51.

Standard text characters are displayed on the cathode ray tube in either $8 \times 16$ or $20 \times 24$ picture element character boxes. The data is written into the display buffer in all points addressable mode from a font table. In this way, the data in the font table can have a variable size character face to allow the characters adjacent to each other to be connected simulating script and for displaying graphic images spanning many character boxes. Such use of the character graphics adapter card is termed graphics mode. Referring again to FIG. 3, the transaction level program modules 103 provide the control logic to interact with the user. These program modules call the function program modules 105, 107, 109, and 111 to perform such functions as display guidance messages and images, read an ID card, issue cash, or communicate with the host computer respectively. Guidance function program 105 provides the interface between the transaction level and the display processor program. Its primary function is to determine whether a language change is necessary for this transaction and arrange the appropriate memory pointers to obtain the character fonts from the proper code page maps which identify the font tables. In addition, this function program sets the hardware control registers to obtain medium resolution monochrome graphics, sets the default background color and foreground color, as well as setting up the pointers to the translate table and default code page.

The display processor 115 receives a message, specification string identified by the transaction processor 103. The message comprises the standard character string data of the type utilized, by the IBM 3270 family of terminals. Display processor 115 interprets the hexidecimal control codes and makes the necessary modifications to display the EBCDIC character codes specified in the standard character string. A character is displayed on display 25 only after display processor 115 has translated the character code into the font image and transferred the font image to the display buffer 117. The display processor also performs the function of clearing the screen and turning the cursor on and off, based upon a flag set by a keyboard code.

Figure 4:
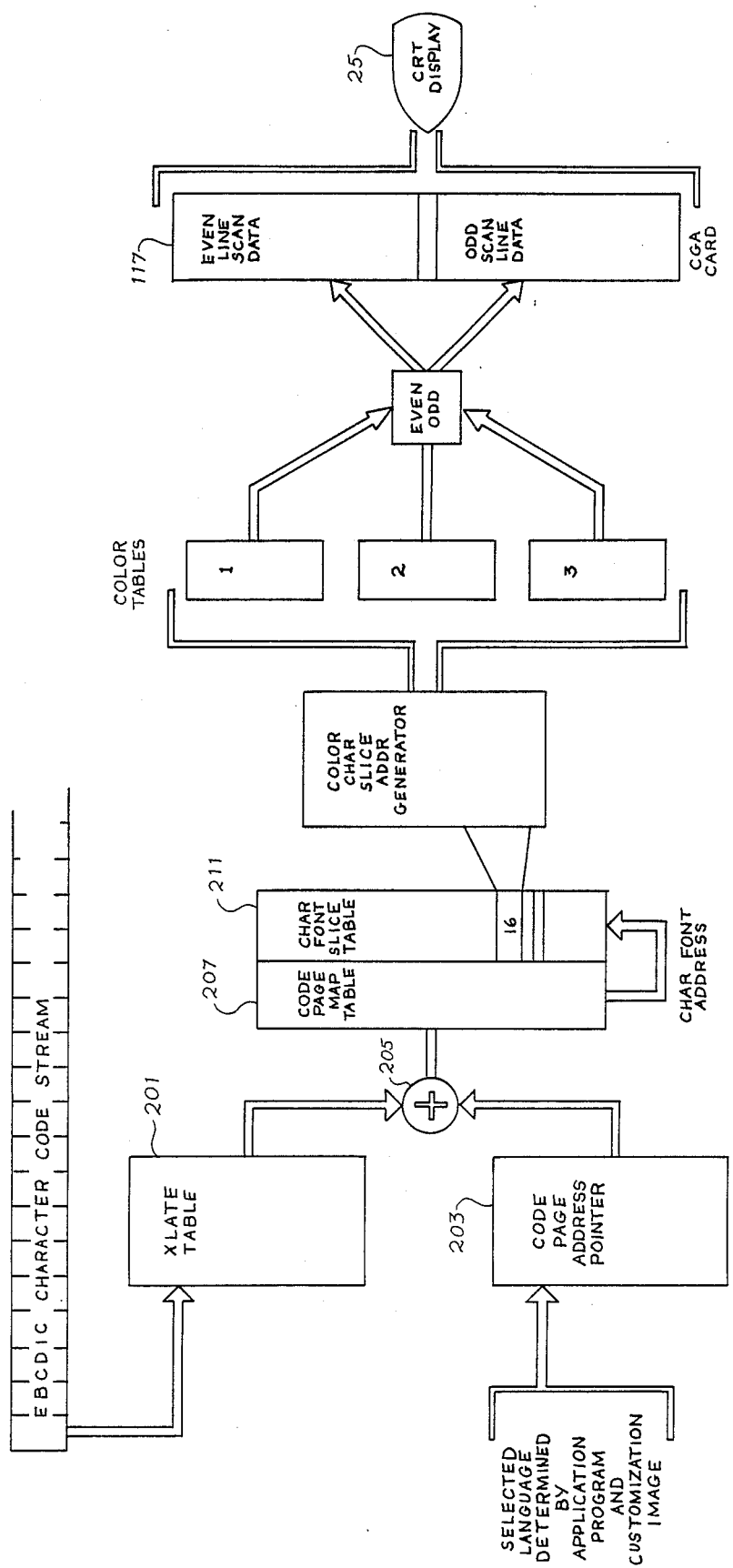
FIG. 4 is a more detailed block diagram of the text display portions of display processor 115 in FIG. 3.

Referring now to FIG. 4, the steps and tables used by display processor 115 are laid out in block diagram form. As previously described, the standard character stream contains the EBCDIC message data to be displayed, the hexidecimal control codes, including graphic escape attribute control codes, and the graphic image data to be displayed in accordance with the invention. FIG. 4 shows how the text character codes are processed by display processor 115 to display the message on CRT screen 25. As depicted in FIG. 4, each EBCDIC character code is translated into its corresponding EBCDIC code or reference number by translate table 201. The reference number is combined with a code page address pointer to generate a pointer into the selected code page to get the address of the character font which will be used as a representation of the EBCDIC code received in the standard character string. Each font in table 211 takes up 16 bytes and are the 8×16 picture elements which are needed to display a character. Character font table 211 contains all of the characters needed for a particular region of the world. Other font tables are provided for other regions and they are selected by different entries in code page address pointer table 203. Some regions of the world, including the Far East, have characters requiring more than 8×16 picture elements. The font tables for those portions of the world contain 72 bytes for each character font. The use of the 72-byte format is also useful to display large characters in any language.

Once the font data has been selected, the character is displayed by the IBM color graphics adapter card which is well documented in the prior art, including a description in the IBM Technical Reference Manual, Part No. 6139821.

Figure 5:
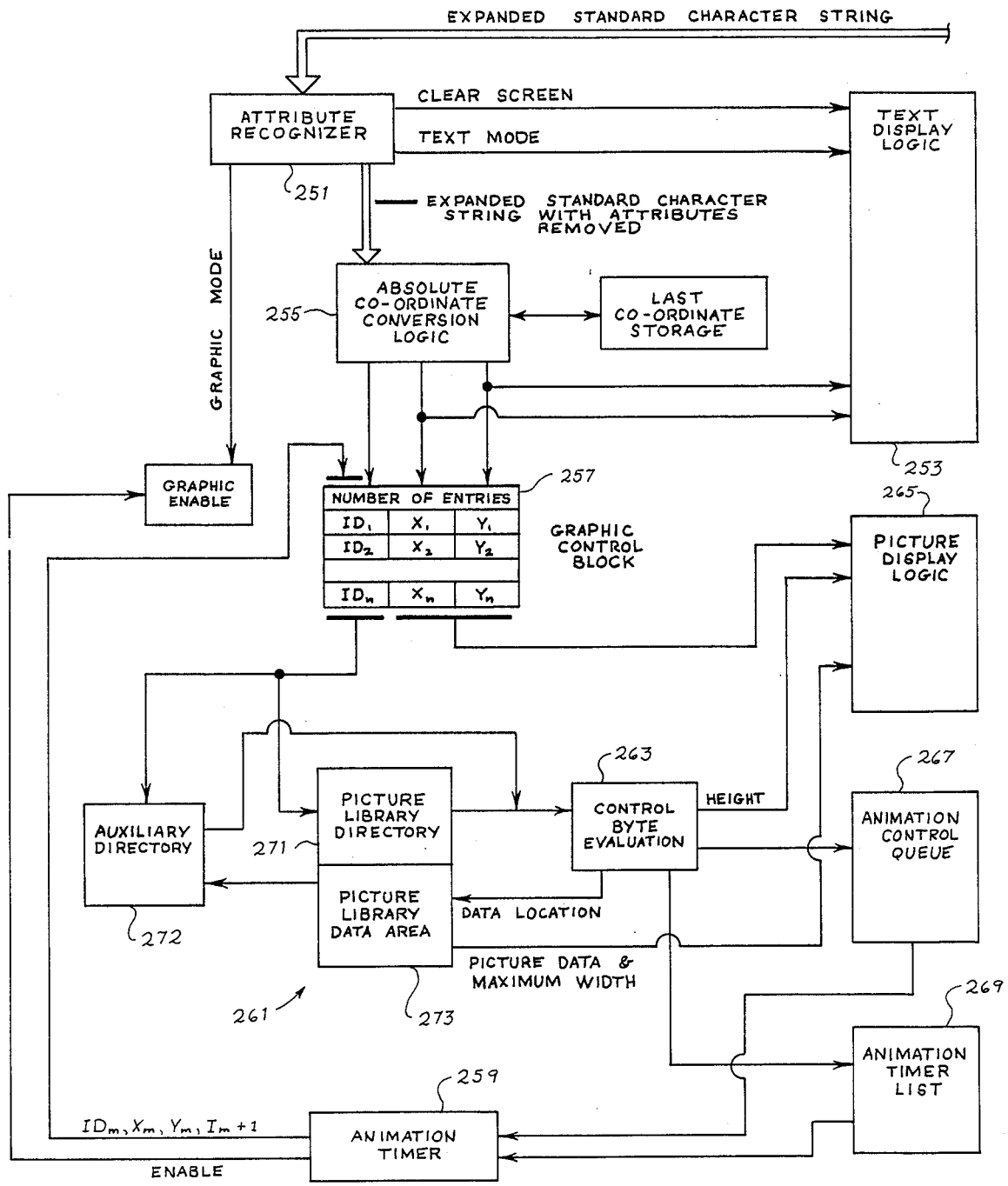
FIG. 5 is a detailed diagram of the graphics display portions of display processor 115 in FIG. 3 according to the invention.

Referring now to FIG. 5, those portions of display processor 115 utilized in displaying graphic images, are set out in more detail. Again, the character string is obtained from the customization image by the transaction application program 103 and provided to scanner 251 which scans the character string for control bytes and attribute bytes. These bytes are scanned in the following priority: clear screen, then graphics attribute and control bytes, and last, the text. The clear screen control byte will be recognized by 251 and sent to programmed logic in the display processor 115 to erase the entire screen. The clear screen control byte, clears the display buffer and various control flags such as the entry point flag and the timer table position index.

When text mode attribute bytes are recognized, scanner 251 switches to text mode and thereafter passes the standard character string message information to the text logic processing portion of display processor 115 which is shown in greater detail in FIG. 4.

When graphics escape attribute bytes are recognized by 251, display processor 115 is switched to graphic mode. After the processor switches to graphic mode, it begins to build a graphic control block 257 from the standard character string. The format of the standard character string, which contains graphics data, is shown in FIG. 6. After having detected the graphics escape attribute bytes, the following six bytes are an absolute position code in the standard character string which is converted into character display position line and column values by conversion logic 255. The absolute position code is immediately followed by a picture ID of two bytes. If a picture ID is encountered without an absolute position code preceding it in the format, as specified in FIG. 6, the previous absolute position values are used for this picture ID by conversion logic 255. Logic 255 stores the picture ID and the character display position line and column values in succeeding records of a Graphic Control Block 257. Graphic Control Block 257 is a temporary buffer into which the above described graphics control information is stored while the string is being scanned. After the standard character string is completely scanned, the display presentation logic uses the control information in the Graphic Control Block to display the picture on the cathode ray tube 25. The presentation logic includes picture library 261, control byte evaluator 263, and picture mover 265. It also includes animation control queue 67 and timer list 269. The animation control queue 267 and timer list 269 are built as direct list member picture type codes are detected from the picture library directory. The presentation logic, using the animation control queue 267 and timer list 269 in response to signals from timer 259 provides a form of animation by successively presenting a sequence of pictures or picture fragments.

PICTURE LIBRARY STRUCTURE

The picture library 261 is divided into two parts, a directory 271 and a picture image data area 273. Both the directory 271 and the data area 273 are composed of records four bytes in length. The directory is composed of 256 records, each related to the access of the actual picture data which is stored in the picture image data area, which is a variable number of records in length.

The directory gives access to the data in the data area at the record level. This directory is so organized that the picture number or ID provides the directory access, and then the directory content provides very fast access to the image data. The picture number, multiplied by four and added to the start address of the directory is the directory entry for that picture. The content of the directory then gives access to the data area or specifies picture control.

The data area is variable length and is concatenated to the directory forming a PC DOS compatible file which is named PICLIB.DAT. Use of PC DOS compatibility allows this file to be copied to or from the machine micro-code diskette for potential revisions of the images therein stored.

The directory consists of 256 fixed length records, each 4 bytes in length. These directory entries both define the actual location and structure of picture information and also picture control. The first byte of this record "CONTROL" is used to define the purpose of the directory entry, and the interpretation of the remaining three bytes. The "CONTROL" byte is structured into two parts, TYPE and DETAIL. In addition a special case of all bits on ( X'FF') is used to define a blank directory location.

TYPE is defined by the two high order bits in this CONTROL byte. The following are the TYPES defined in the advanced user guidance subsystem.

00—defines "DIRECT DATA REFERENCE" which means that the remainder of the record points to actual image data area.
01—is reserved.
10—defines "DIRECT LIST MEMBER" which means that the remainder of the record defines picture control ( eg. animation step ).
11—defines "INDIRECT LIST MEMBER" which means that the remainder of the record points to picture control information in the data area of the library.

STRUCTURE OF THE DIRECTORY AREA OF THE PICTURE LIBRARY

DIRECT DATA REFERENCE directory entry.

|CONTROL|HEIGHT|OFFSET|

A Direct Data Reference directory entry (00xx xxxx value for the control byte ) uses the lower six bits of the CONTROL byte to define the DETAIL of the data structure of the information in the data area.
000001—Byte boundary background suppression.
000010—Byte boundary background suppression with a background fringe.
000111—byte string compression.
001100—Rectangular Paint.
  The remainder are reserved for possible future use.
  The remaining three bytes in a "Direct Data Reference" directory entry are "HEIGHT" and "OFFSET".
  The "HEIGHT" field is a single byte used to specify the number of scan lines the picture data occupies. The display presentation logic uses this data to determine how many picture data records it needs to get from the picture image to reconstruct the picture, and also to determine if the image will extend beyond the bottom of the real screen.
  The "OFFSET" field is two bytes used to point to the start of the picture data.
  The "OFFSET" field contains the number of four byte records from the start of the library to the desired picture image data. Thus multiplying the "OFFSET" for any picture by four and adding it to the start of the library brings you to the beginning of the picture image data for that picture.
  If the size of actual storage is less than the 256K maximum then the OFFSET becomes the access pointer to extended storage, for example on a diskette file.
  The picture image data is blocked into four byte records which requires that the last picture image data for each picture must be on a 4 byte boundary or must be padded to the next boundary.

DIRECT LIST MEMBER directory entry.

A Direct List Member directory entry (1000 0000 value for the control byte ) provides control for sequential frame animation.

|CONTROL|SHOW|NEXT|TIME| where
CONTROL is a one byte field with the hex value of X'80"
SHOW is a one byte field which is the picture ID of the actual picture to be shown.
NEXT is a one byte field which is the picture ID of the next directory record in the animation list.
TIME is a one byte field containing a count in fifty millisecond intervals of the time delay before the next animation list reference is made.

INDIRECT LIST MEMBER directory entry.

|CONTROL|LENGTH|OFFSET|

An Indirect List Member directory entry (1100 0000 value for the control byte ) is similar to a list of Direct List Members except the list is stored in the picture data area rather than in the directory.

The remaining three bytes in an "Indirect List Member" directory entry are LENGTH and OFFSET fields.

The LENGTH field is a single byte used to specify the number of records occupied by the list of "direct list members" stored in the image data area.

The OFFSET field is two bytes used to point to the start of the list in the data area. Thus multiplying the OFFSET for any picture ID of a indirect list member by four and adding it to the start of the library brings you to the beginning of the list referenced by that ID.

If the size of actual storage is less than the 256K maximum then the OFFSET becomes the access pointer to extended storage, for example on a diskette file.

STRUCTURE OF THE DATA AREA OF THE PICTURE LIBRARY

DIRECT DATA REFERENCE directory entry.

A Direct Data Reference directory entry (00xx xxxx value for the control byte ) uses the lower six bits of the CONTROL byte to define the DETAIL of the data structure of the information in the data area.
000001—Byte boundary background suppression.
000010—Byte boundary background suppression with a background fringe.
000111—Byte string compression.
001100—Rectangular paint.
  The remainder are reserved for possible future use.

BYTE BOUNDARY BACKGROUND SUPPRESSION

For CONTROL of 0000 0001 ( X'01), the data is stored as follows.

| FIELD LENGTH | MAXWIDTH |

| SKIP 1 | LENGTH 1 | DATA 1 | ... |

The picture image data consists of variable size records which specify the image to be displayed. The number of display lines per picture is specified in the directory by the HEIGHT field. This also allows the reconstruction process to identify that the picture fragment will extend below the lowest line of the screen. The first two bytes of the image data is the FIELD LENGTH and is used to indicate the total number of bytes in the compressed picture. This information is not essential, but simplifies the program that allows generation and editing of picture fragments. The next two bytes specify the MAXWIDTH of the picture fragment in number of bytes thus allowing the reconstruction process to identify that "wraparound" ( where a picture extends beyond the edge the screen ) will occur. The remaining part of the picture image file consists of "background suppressed" display scan lines, concatenated one after another. Each of these compressed lines has a data form of:

|SKIP|LENGTH|d1|d2|...|dn| where n=LENGTH

SKIP is a one byte field defining the number of bytes from the picture reference origin to the first byte to display as part of this line of the picture fragment.

LENGTH as shown above is the number of bytes of PEL's to be displayed as part of the picture fragment. In practice both SKIP and LENGTH are determined by the left most and right most bytes that contain a PEL other than background.

The picture fragment lines are stored in "interlaced" form, where line number n+1 follows line number n.

The picture image data is blocked into four byte records which requires that the last picture image data for each picture must be on a 4 byte boundary or must be padded to the next boundary.

This mode of data storage provides a very efficient fit to the string move instructions of modern micro-processors. Further this mode, together with fragmentation, results in a reasonably efficient storage usage. Together the result is very fast graphics display, low microprocessor cycle consumption, and efficient storage of guidance graphics. This mode ( and CONTROL=X'02) are the preferred picture modes to use in interactive self-service transaction steps.

BYTE BOUNDARY BACKGROUND SUPPRESSION WITH BACKGROUND FRINGE

For CONTROL of 0000 0010 ( X'02), the data is stored as follows.

| FIELD LENGTH | MAXWIDTH |

| SKIP 1 | LENGTH 1 | DATA 1 | ... |

The specific definition is exactly the same as CONTROL 0000 0001 but in practice the first and last bytes in the data field are not the first and last bytes with a non-background PEL, but rather one or more bytes of all background PEL's. In a similar manner, the data on lines above and below colored PELS is also set to background so as to be able to erase a residual image as an image moves on subsequent frames.

This allows a picture fragment to replace a previous fragment where the second is slightly offset from the first, as in a motion animation, and the background fringe thus erases the old image. Note that for user guidance the limited animation does not include the concept of a foreground and background picture. While multi-plane, background and sprite systems are known in the art they are quite resource consuming and are not needed to provide guidance to a machine user.

BYTE STRING COMPRESSION

For CONTROL of 0000 0111 ( X'07), the data is stored as follows.

| FIELD LENGTH | MAXWIDTH |

|SKIP | TIMES or LENGTH |DATA 1 | ... |

The picture image data consists of variable size records which specify the image to be displayed. The number of display lines per picture is specified in the directory by the HEIGHT field. This also allowed the reconstruction process to identify that the picture fragment will extend below the lowest line of the screen.

The first two bytes of the image data are used to indicate the total number of bytes in the compressed picture. This information is not essential, but simplifies the program that allows generation and editing of picture fragments.

The next two bytes specify the maximum width of the picture fragment in number of bytes thus allowing the reconstruction process to identify that wraparound ( where a picture extends beyond the edge the screen ) will occur. The remaining part of the picture image file consists of "byte string compressed" display scan lines, concatenated one after another. Each of these compressed lines has a data form composed of a combination of the following two types of compressed image.

|x,SKIP|1,TIMES|r| where r=the byte to be replicated

SKIP is a one byte field defining the number of bytes from the present position or the picture reference origin to the next byte to display as part of this line of the picture fragment. If the most significant bit of the SKIP byte (x) equals ZERO, then the start of a new line is indicated. If equal to ONE, a continuation of the present line is indicated.

1,TIMES is a one byte field that defines the number of times that the "r" byte is to be replicated. Note that the high order bit is a "1".

|x,SKIP|0,LENGTH|d1|d2|...|dn| where n=length

SKIP is a one byte field defining the number of bytes from the present position or the picture reference origin to the next byte to display as part of this line of the picture fragment. The most significant bit of the SKIP byte (x) if =0 signifies start of new line, if 1 a continuation of the present line.

0,LENGTH as shown above is the number of bytes of PEL's to be displayed as part of the picture fragment.

The picture fragment lines are stored in "interlaced" form, where line number n+1 follows line number n.

The picture image data is blocked into four byte records which requires that the last picture image data for each picture must be on a 4 byte boundary or must be padded to the next boundary.

RECTANGULAR PAINT

For CONTROL of 0000 1100 ( X'0C ), the data is stored as follows.

```
|    FIELD LENGTH    |    MAXWIDTH    |
| CHAR COL 1 | CHAR LINE 1 | DATA | unused |
| CHAR COL 2 | CHAR LINE 2 |     unused    |
```

The first two bytes of the image data are used to indicate the total number of bytes in the compressed picture. This information is no essential, but simplifies the program that allows generation and editing of picture fragments.

The next two bytes specify the maximum width of the picture fragment in number of bytes thus allowing the reconstruction process to identify that wraparound ( where a picture extends beyond the edge the screen ) will occur.

CHAR COL 1 and CHAR LINE 1 are one byte fields which define the upper left corner of the character box where the paint is to start, relative to the absolute position assigned to the picture ID.

CHAR COL 2 and CHAR LINE 2 are one byte fields which define the lower right corner of the character box where the paint is to stop.

DATA is the one byte field containing the byte to be replicated throughout the rectangle defined above.

INDIRECT LIST MEMBER

An Indirect List Member directory entry ( 1100 0000 value for the control byte ) indicates that an actual animation list is stored at the referenced location in the data area of the library. These lists are numerically based only against them selves and when activated execute from an auxiliary directory and have an access sequence number which serves to assist the "next" to fully define the next animation list member to activate.

The data stored in the data area is organized as follows

```
         4 bytes
| FIELD LENGTH |    unused           |
| X'80 | SHOW | NEXT | TIME_X |
|  .   |  .   |  .   |   .    |
|  .   |  .   |  .   |   .    |
|  .   |  .   |  .   |   .    |
```

The first two bytes FIELD LENGTH is used to indicate the total number of bytes in the list. This information is not essential, but simplifies the program that allows generation and editing of picture fragments.

The next two bytes are not used but serve to keep the remainder on byte boundaries.

The remainder of the data is a list of Direct List Members. NEXT is defined only against other members of that list, where the first entry has an ID equivalent of 00.

This list, when called by an ID from the SCS data, is moved to an 'auxiliary directory' for execution.

TABLE_AUXILIARY DIRECTORY STRUCTURE
5 BYTES

| ENTRIES | SEQ # | CONTROL | SHOW  | NEXT  | TIME   |
|---------|-------|---------|-------|-------|--------|
| 0       | 1     | X'80'   | ID_49 | ID_01 | TIME_X |
| 1       | 1     | X'80'   | ID_4C | ID_00 | TIME_X |
| 2       | 2     | X'80'   | ID_4A | ID_01 | TIME_X |
| 3       | 2     | X'80'   | ID_4B | ID_02 | TIME_X |
| 4       | 2     | X'80'   | ID_4C | ID_00 | TIME_X |

In the example above,

Entries 0–1 and 2–4 define sequential frame animation loops. The second byte of each DIRECTORY ENTRY is the actual ID to SHOW and the third byte defines the NEXT DIRECTORY ENTRY having the same sequence number to access after a TIME_X DELAY as specified in byte 4 of the DIRECTORY ENTRY.

OPERATION OF THE INVENTION TO DISPLAY STATIC PICTURES

Figure 7:
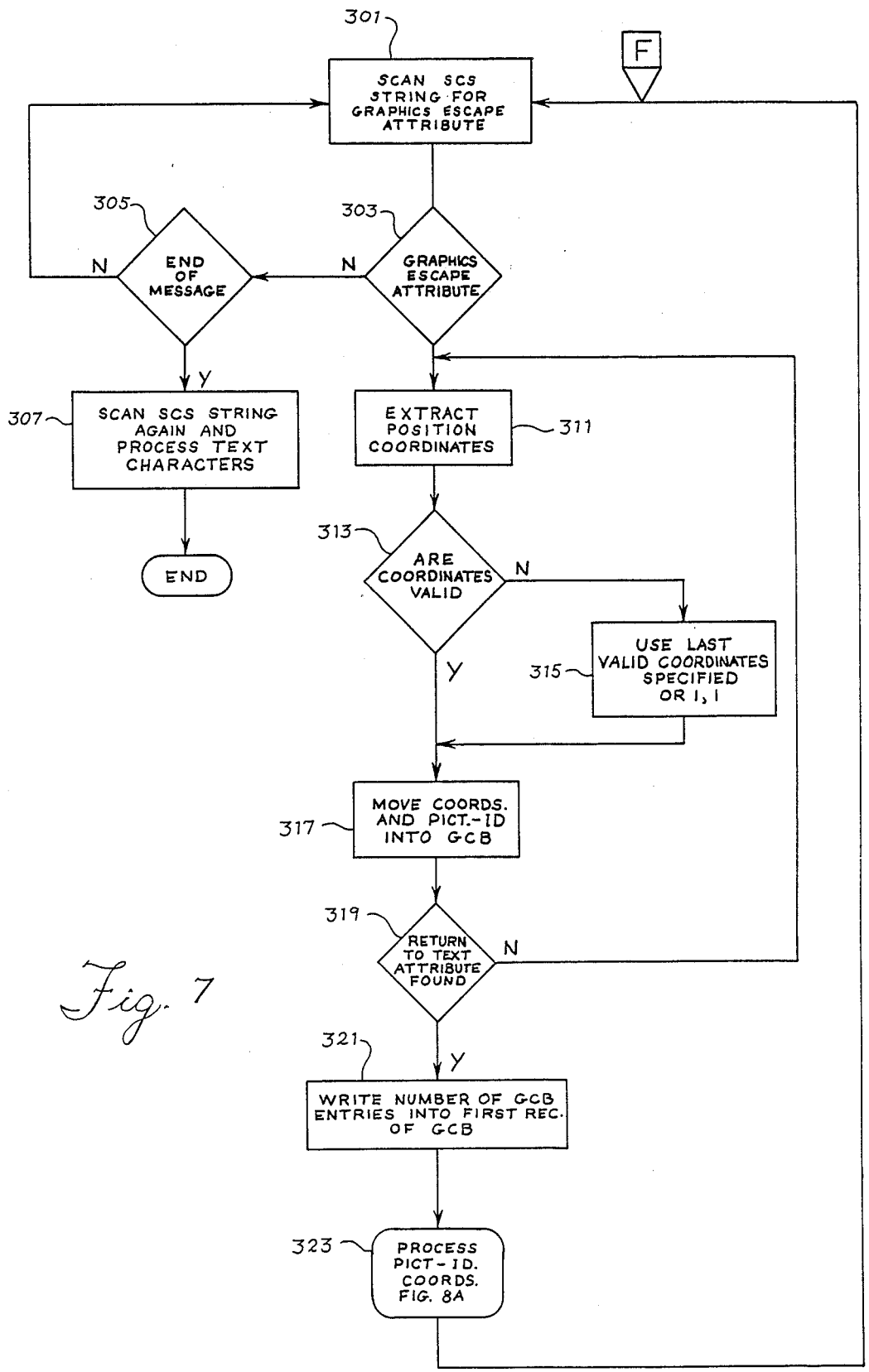
FIG. 7 is a flow diagram of the operation of the block diagram of FIG. 5.

Turning now to FIG. 7, a flow chart is set out showing the operation of scanner 251 and conversion logic 255 shown in FIG. 5. The process starts at block 301 of FIG. 7 where scanner 251 scans the standard character string for a graphics escape attribute. The attribute is detected at decision block 303. Until it is detected, the process continues scanning the standard character string until found or decision block 305 detects the end of the string. If the end of the message is reached before a graphics escape attribute is detected, scanner 251 switches to text mode at block 307 and the whole string is processed as text by block 253 in FIG. 5.

This same exit from block 305 to block 307 is utilized after graphics data has been processed. Control returns via path 309 to block 301, when a string contains both graphics and text.

When a graphics escape attribute is detected by block 303 control passes to block 311 where the conversion logic 255 attempts to extract the display line and character position from the next six bytes of data which are expected to be the absolute position code. The coordinates are checked for validity at block 313. If they are not a valid display screen position code as defined in FIG. 6, block 315 will use the last valid coordinate. If this is the first graphics escape from a clear screen, coordinate 1,1 is used.

When a valid coordinate has been established, by detection at block 313 or creation by block 315, the coordinates and the related picture ID are stored at block 317 into the graphics control block 257. The process continues at block 319 which returns control to block 311 unless a return to text attribute is found. In this way the graphics control block is built containing all of tee picture IDs with their associated display position coordinates. When block 319 does find the return to text attribute, control passes to block 321 which writes into the first record of the graphics control block, the number of picture IDs stored into the graphics control block.

Control then passes to block 323 where the picture IDs are evaluated and further processed for direct data reference, for direct list member, or for an indirect list member as described in more detail in FIG. 8A through 8E.

Figure 8A:
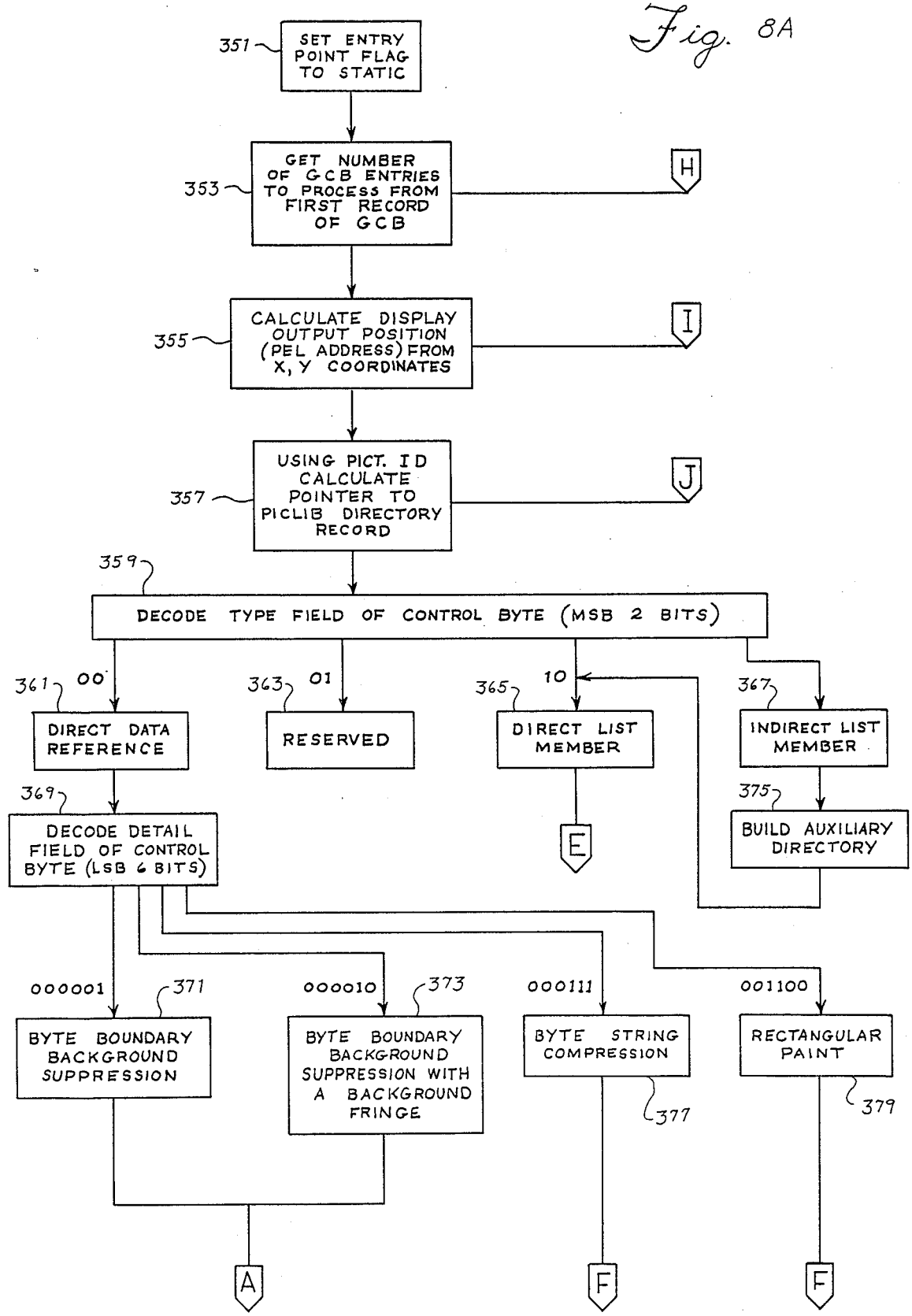
FIG. 8A–8E are more detailed flow diagrams of the operation of the invention.

Starting with FIG. 8A, at block 351, the various process flags that control the process are set including the entry point flag which is set to static entry. The next step 353 is to get, from the first record of the graphics control block, the number of entries to process from the graphics control block which was built by the logic of FIG. 7.

Entries are actually retrieved from the graphics control block at 355 and the display output position on the screen is calculated from the x and y coordinates that are the first two fields in the entry. Then at block 357, the picture ID is multiplied by 4 and added to the address of the top of the picture library. This value is used as the pointer to the address of the 4 byte record in the picture library directory 271 which is the control record for the picture to be displayed.

The most significant two bits of the control byte which is the first byte of the record just addressed are then decoded at block 359 to determine the type of the directory record. There are four possible types as identified at blocks 361, 363, 365, and 367. If the directory record is a 00, process continues to block 361 indicating that directory entry is a direct reference type. The remainder of the directory record contains the height of the picture in scan lines and the two byte offset to the actual picture data records.

Thereafter at block 369, the remaining field of six bits in the control byte are decoded to determine the format of the picture data in the picture data area of the picture data library. A 000001 field detected at block 371 indicates byte boundary background suppression type of data. A 000010 field detected at block 373 indicates byte boundary background suppression with a background fringe. Both of these types of picture data are processed by the logic flow diagram in FIG. 8B.

Figure 8B:
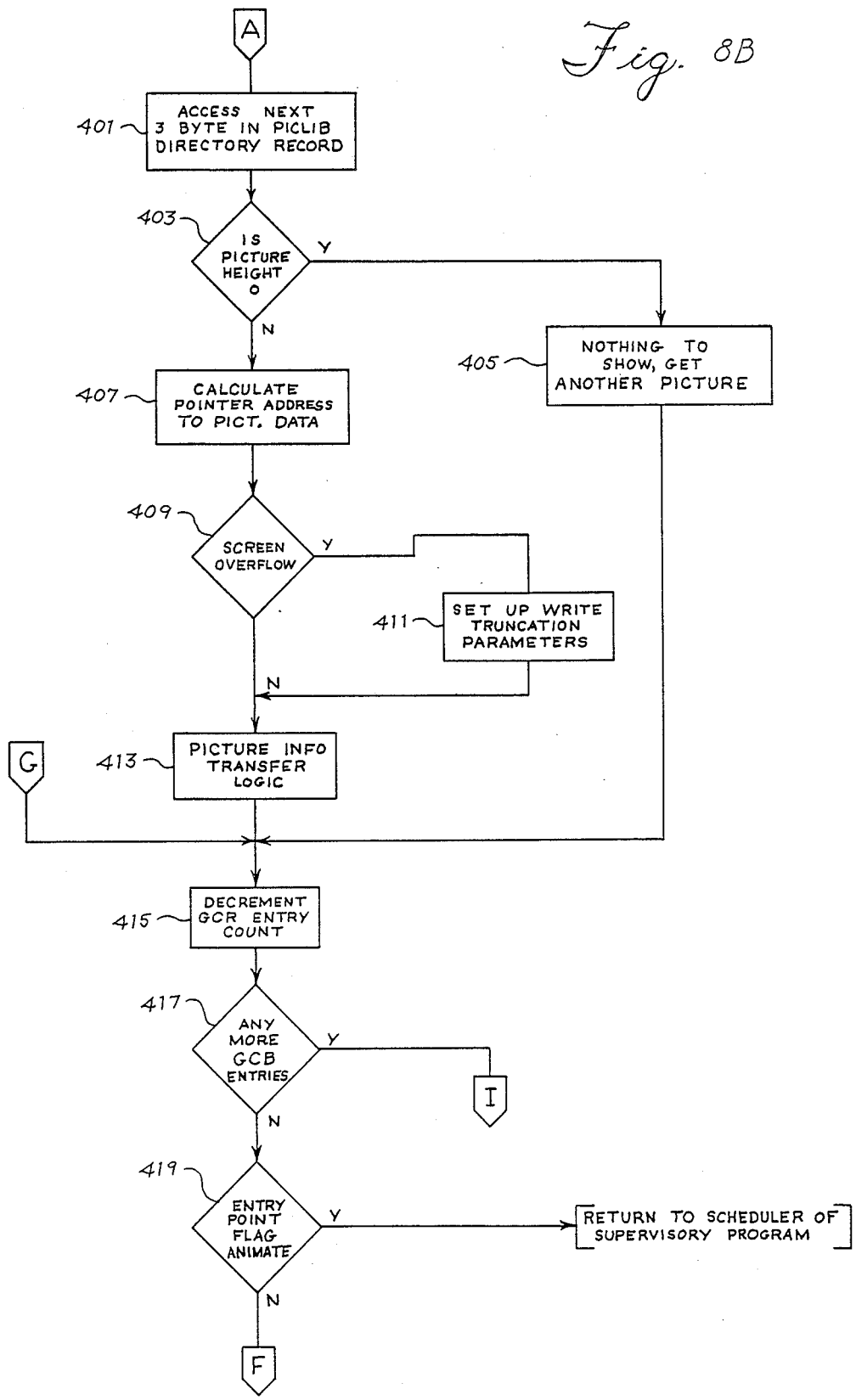

The first step 401 in FIG. 8B is to access the next three bytes of the directory record of the picture ID specified in the graphics control block 257. At block 403 the picture height is tested for a zero value to indicate that a picture has been removed from the library. If a zero value is found there is nothing to display and control moves to the next graphics control block entry at block 415.

If the height is a finite value, the logic proceeds to block 407 where the pointer address to the picture data is calculated by multiplying the picture ID by four. The first record accessed from this picture library data area 273 contains a two byte definition of the maximum width of the expanded picture. Block 409 uses height and maximum width to check for possible screen overflow. If overflow would occur, control passes to block 411 which establishes truncation parameters that are later used in the picture information transfer logic block 413.

Figure 8C:
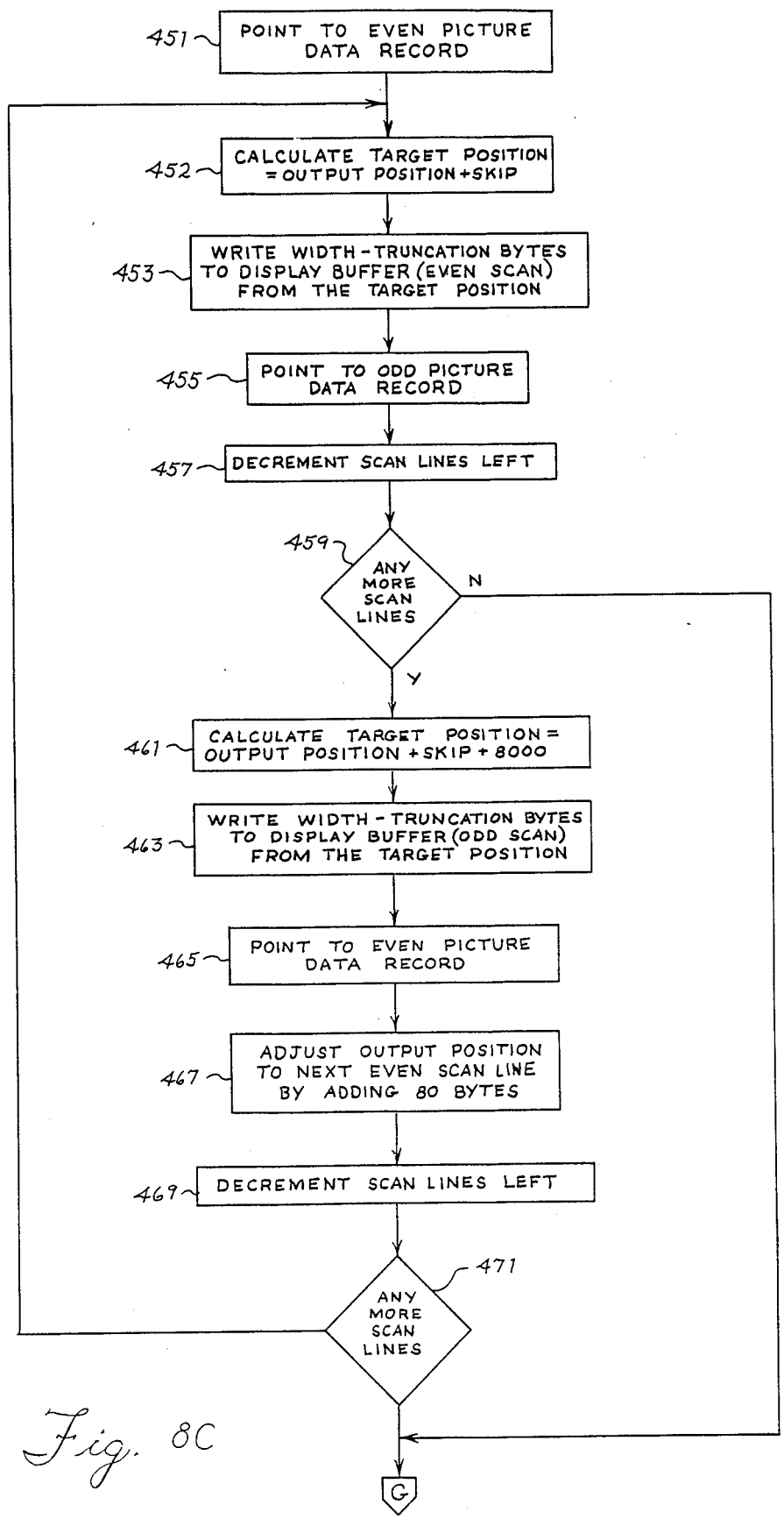

Reference is now directed to FIG. 8C where the logic of block 413 is set out in detail. Block 451 accesses the next two bytes of picture data which are a one byte skip field and a one byte width field of the even scan line to be displayed. In block 452 the skip field defines the number to be added to the output position to yield the move string target position. The width field defines the length of the string to be moved to the target position. The next position in the picture data area of the picture library following the width byte is the starting location of the source string to be moved.

Block 453 calculates the length of the string to be moved by subtracting the truncation value from the width byte, and moves the picture data string to the display buffer 117. The move instruction automatically increments the source address such that at the end of the move operation it now points to the next skip byte. If the width was truncated, the truncation value must be added at block 455 to the source address to account for the shortened move operation and point to the odd data record.

Block 457 then decrements the height field which is the number of scan lines remaining to be displayed. Block 459 uses the adjusted height value to determine whether there are more scan lines to display. If not, control passes to block 415 in FIG. 8B to display the next picture or text. If more scan lines exist, logic flows to block 461 which accesses the next two bytes of picture data. They are a one byte skip field and a one byte width field of the odd scan line to be displayed. The skip field defines the number to be added to the output position to yield the move string target position. When writing odd scan lines to display buffer 117, the target position is adjusted by adding 8000 to reach the odd half of the buffer. The width field defines the length of the string to be moved to the target position. The next position in the picture data area of the picture library following the width byte is the starting location of the source string to be moved.

Process block 463 calculates the length of the string to be moved by subtracting the truncation value from the width byte and moves the picture data string to the display buffer 117. The move instruction automatically increments the source address such that at the end of the move operation it now points to the next skip byte. If the width was truncated, the truncation value must be added at block 465 to the source address to account for the shortened move operation and point to the even data record.

Process block 467 then calculates the output position of the next scan line to be displayed by adding a count of eighty to the present output position. Block 469 then decrements the height field which is the number of scan lines remaining to be displayed. Block 471 uses the adjusted height value to determine whether there are more scan lines to display. If not control passes to block 415 in FIG. 8B to display the next picture or text. If more scan lines exist, logic flows to block 452 which makes use of the next two bytes of picture data. They are a one byte skip field and a one byte width field of the even scan line to be displayed. The skip field defines the number to be added to the output position to yield the move string target position. The width field defines the length of the string to be moved to the target position. The next position in the picture data area of the picture library following the width byte is the starting location of the source string to be moved.

Block 471 uses the adjusted height value to determine whether there are more scan lines to display. If not control passes to block 415 in FIG. 8B to display the next picture or text. In FIG. 8B, block 415 decrements the graphics control block entry count and block 417 determines if there are any more entries to process. If there are additional entries, control passes to block 355 in FIG. 8A. Such additional entries cause the logic flow of FIGS. 8A, 8B, and 8C to repeat for each entry in the graphics control block.

When block 417 finds that all of the entries in the graphics control block have been processed, control passes to block 419. Block 419 inspects the entry point flag. If set to static, control passes to FIG. 7, block 301 where the process of scanning the standard character string continues. If the entry point flag is set to animate to indicate entry into the flow diagram at block 521, FIG. 8E, control is returned to the self service transaction machine supervisory control program.

OPERATION OF THE INVENTION IN DISPLAYING ANIMATED PICTURES

Returning to FIG. 8A block 359, as previously mentioned, one of the control types recognized is 10. On recognition of control type 10, control passes to block 365 indicating that directory entry is a direct list member type. The remainder of the directory record contains an ID of a picture to be displayed, an ID to serve to access the next subsequent direct list member after a specified period of time, which is determined by the value in the fourth byte. A group of direct list members comprise a sequence of pictures to be shown which provides animation.

Figure 8D:
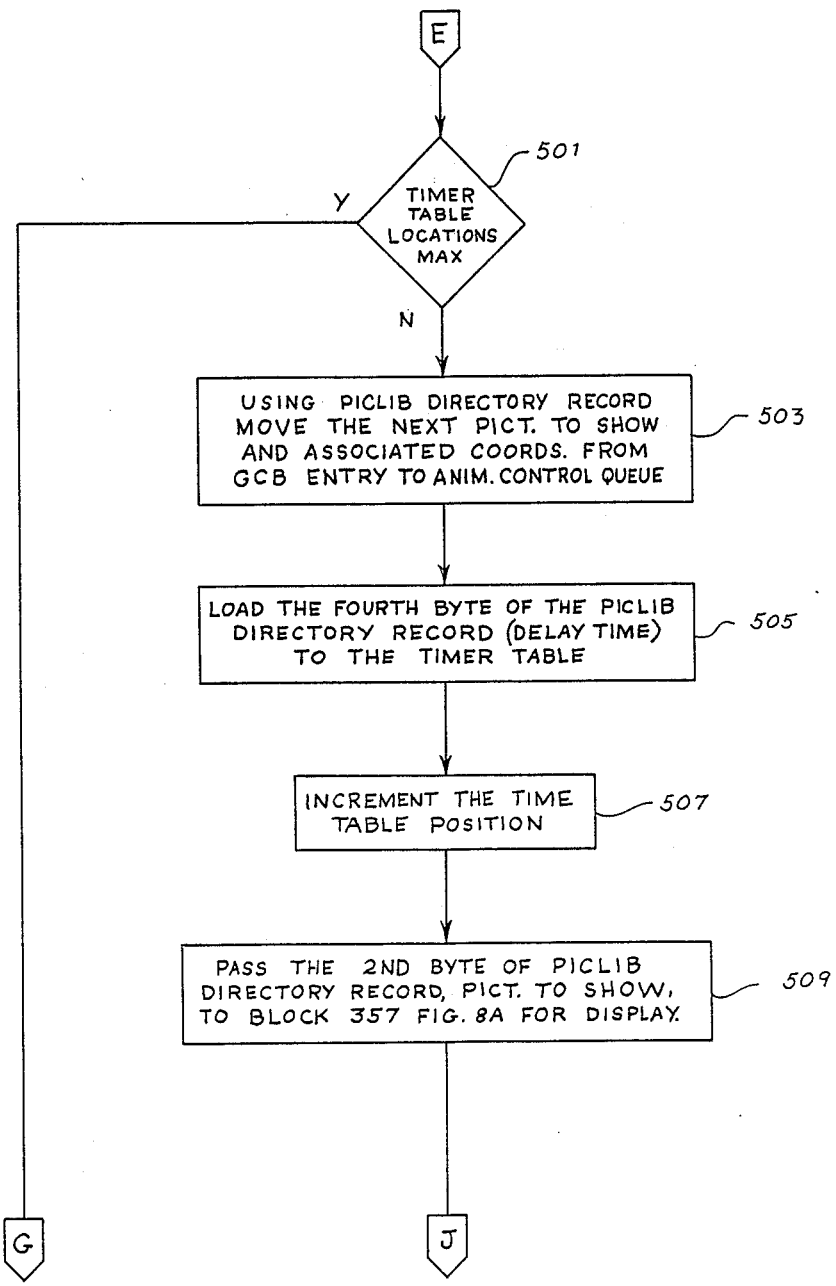
Figure 8E:
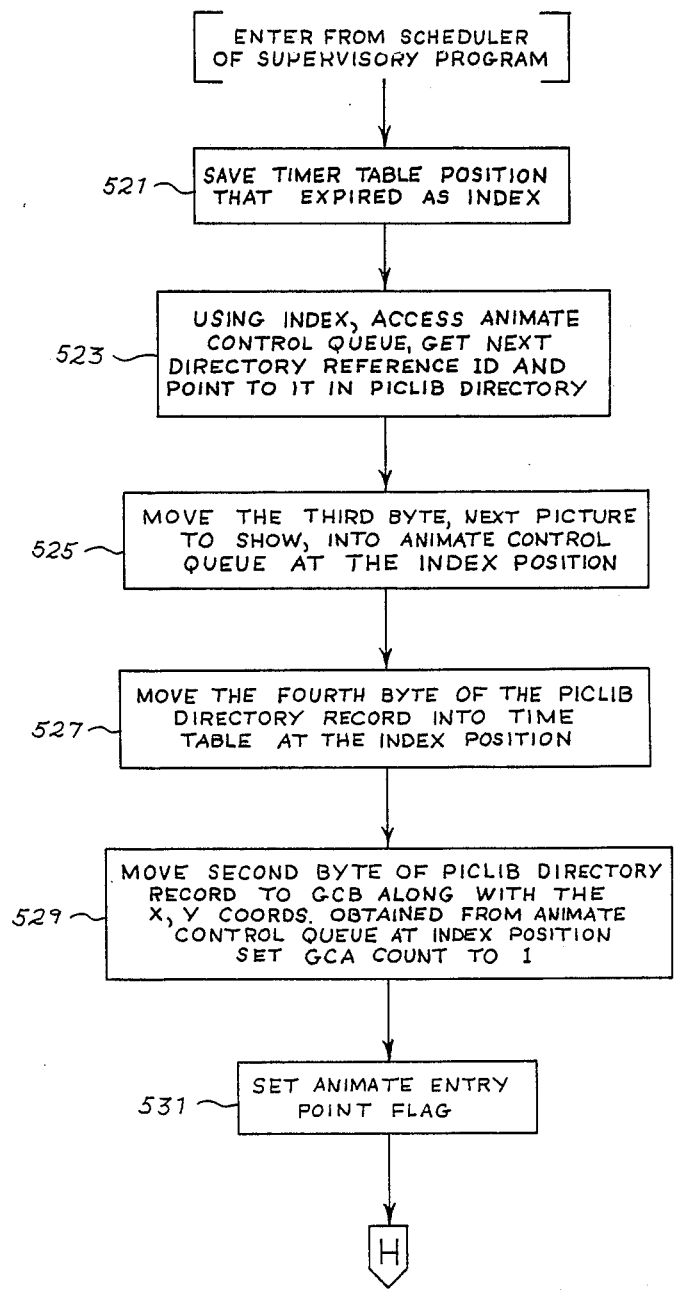

From block 365, control passes to block 501 in FIG. 8D. Block 501 tests the number of timer table locations that are presently utilized. When entering the first animation picture onto a clear screen, the timer table locations utilized will be zero. If the number of timer table positions utilized is equal to the maximum number of timer table positions, eight in this embodiment, control then passes to block 415 in FIG. 8B, which gives the effect of ignoring that animation process. This limit of eight exceeds the guidance requirements for a self service transaction machine. Assuming block 501 found the timer table not full, control passes to block 503.

The process of block 503 is to move the third byte, which is the next list member field, of the picture library directory record and the corresponding X and Y coordinates from the graphics control block 257 to animation control queue 267 at the entry position equal to the timer table position. Control then passes to block 505.

In block 505, the last byte of the directory record, which is the time delay byte is loaded into the timer table 269 at the current timer table position. Control now passes to block 507 where the current timer table position is incremented. From block 507, control passes to block 509 where the second byte of the picture library directory record is passed to block 357 in FIG. 8A as the picture to be displayed. The process following block 357 results in the first picture in this animation sequence being immediately displayed. Each subsequent picture fragment of this animation sequence is displayed as its corresponding time interval stored in timer table 269 expires. The timer table values are decremented by the supervisory program. When each of these times expire, the supervisory program passes control to FIG. 8E, block 521. The timer table location number of the timer which expired is saved as an index and used for accessing the animate control queue and the timer table. Using this index to access the animate control queue, the next directory reference ID is obtained.

Block 523 uses this directory reference ID to access the corresponding directory record. Such access involves use of the starting address of the directory and the ID multiplied by four. Next, in block 525, the third byte of the directory record is entered into the list member position of the animate control queue 267 at the index saved by block 521. The X and Y coordinates previously stored in the coordinate positions of the animate control queue entry at the index saved by block 521, serve as the screen position coordinates for the picture ID just entered.

Continuing to block 527, this saved index is used to store the fourth byte obtained from the directory into the timer table. Next in block 529, the second byte obtained from the directory record together with the X and Y position coordinates obtained from the animate control table at the location referenced by the index are stored into the first position of the graphics control block 257. The entry count of the graphics control block is set to one. The next step at block 531 sets the entry point flag to animate entry. From block 531, control is passed back to block 353 in FIG. 8A.

OPERATION OF THE INVENTION USING AN AUXILIARY DIRECTORY

Returning to Block 359, FIG. 8A, a third control TYPE can be recognized, INDIRECT LIST MEMBER code 11. This decode will cause control to pass to block 367.

The directory record with a control byte of 1100 0000 indicates that a group of records comprising a list of direct list members is stored in the picture data area of the picture library 273. Byte two of this directory record is the number of records so stored, bytes three and four of the directory record are the offset which when multiplied by four and added to the start location of the picture library provide the address to the group of stored direct list members. These members are accessed and stored by process block 375 into an auxiliary directory 272 where they function identically to direct list members stored in the picture library directory 271 until cleared by the next decode of a clear screen control code by block 251 in FIG. 5. Following this block, control passes to block 365 in FIG. 8A where the first record is processed as a direct list member.

CREATION AND DISPLAY OF GUIDANCE IMAGES

Figure 9:
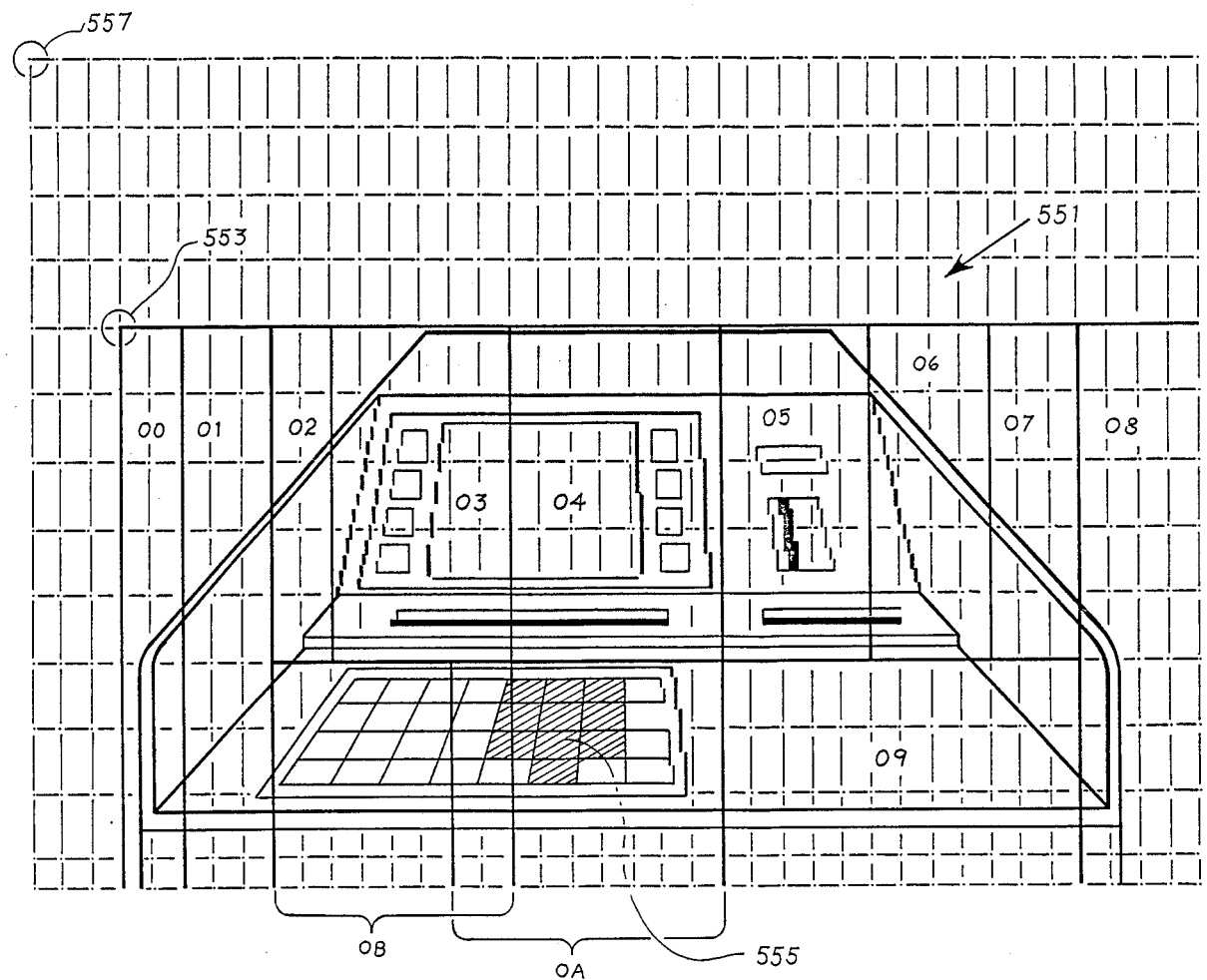
FIG. 9 shows an image of the console of the machine for display to a user.

Having described the apparatus and method of efficiently storing expanding, and placing graphic picture fragments on a display screen, the method of using these features according to the invention to effectively guide a transaction machine user will be described with reference to FIGS. 9 through 12. FIG. 9. shows a base image 551, of the user's console of the self service transaction machine, on a guidance display screen 25 of the self service transaction machine shown in FIG. 1. The grid lines in this figure represent text character display locations which do not show in an actual display, but are shown here to assist in understanding how the invention works.

The base image 551 is limited to that level of detail that is necessary to graphically communicate the various components of the machine and their location with respect to the position of the user. For this reason a line drawing is used. The base image 551 is divided into a number of picture fragments labeled become the picture IDs in the picture library 261 of FIG. 5. To facilitate combining graphics with text, the picture comprising all of its fragments is placed on text character position boundaries. For convenience, each picture fragment is referenced to one origin. In this example, the origin 553 is chosen to be the fourth character position in the fifth line of text. Because the fragments of the base image are all drawn with respect to the same origin, the entire image can be placed anywhere on the screen by merely choosing a different X and Y coordinate screen location following the picture ID in the standard character string message from the transaction application program.

The image of FIG. 9 is created on a personal computer, using any of the commercially available graphic design programs which run on personal computers and generate a binary file of the graphic image which was created at the personal computer. In this way, the owner of the self-service transaction machine can readily create new graphic images to provide an interesting and attractive appearance of the self-service transaction machine to the public.

Figure 10:
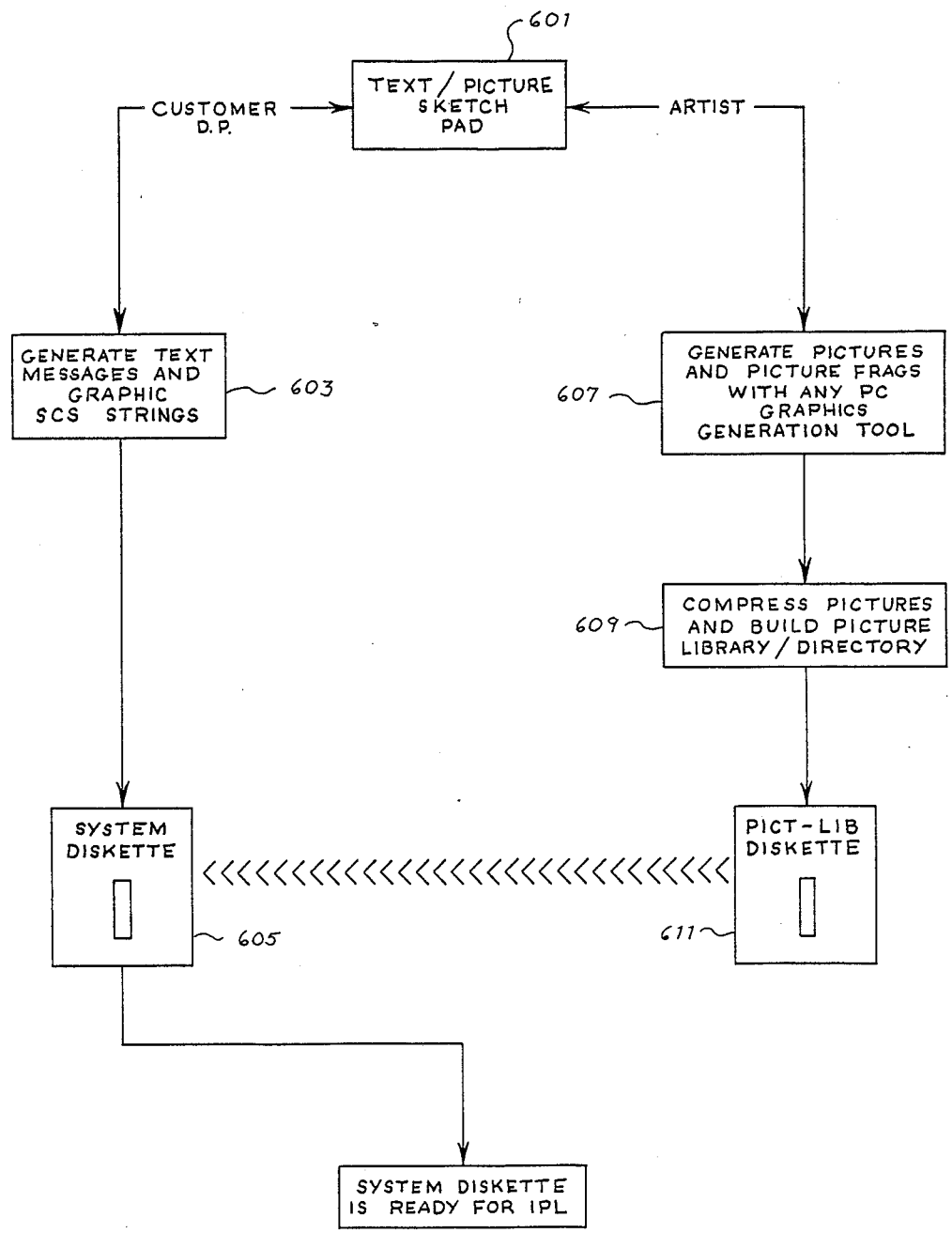
FIG. 10 shows the steps of creating images used in the invention.

The artistic design of the guidance messages typically starts in a conference between an artist and a transaction machine operations person. They will typically lay out their thoughts on a sketch pad 601 in FIG. 10. The operations person, taking a copy of the sketched guidance message proceeds to step 603. At step 603, the text, graphic escape attribute control codes, picture IDs and display location coordinates are prepared as standard character string messages. These messages are added to the personalization storage area of the transaction machine where they are accessible to the application programs that control each transaction of which guidance is a part. In FIG. 10, this storage area is a diskette 605.

The artist takes a copy of the same sketched guidance message and, at step 607, generates the art work on a personal computer, using a commercially available graphic design program. For example the base image 551 of FIG. 9 is created as a single picture. This single picture is saved as a binary file in the personal computer. It can then be used to recall the base image for editing to create each of the picture fragments 00–0B and to create variations of them for emphasizing certain actions to be taken at certain locations on the transaction machine console. For example, an alternate 0A' to picture fragment 0A is created with the numeric keys 555 in fragment 0A solidly illuminated. Line drawn fragment 0A is later displaced alternately with solidly illuminated fragment 0A' using the animation method previously described with respect to FIG. 8.

The generation of a picture fragment such as 00 is accomplished by several different methods. A convenient way is to use a copy of the saved base image file and move the image so that the origin 553 is relocated to coordinate 1,1 numbered 557 in FIG. 10. After the entire picture is relocated to the upper left corner of the working screen, it may be convenient to add reference marks to the area outside of the picture to assist in locating the boundaries of the image fragments. Then the image outside of the fragment being created is erased to leave only the background color. This fragment is then stored as a binary file incorporating the picture number into the file name for convenience in later processing the fragment into the form required by the picture library 261. Each fragment is created in like manner.

Returning again to FIG. 10, step 609, the binary files are processed, to compress the files into the picture library directory and data area structure previously described. This is accomplished by the logic shown in the flow diagram of FIG. 11. After being processed into a picture library 611, it is copied onto diskette 605 which is the personalization storage area of the transaction machine.

Figure 11:
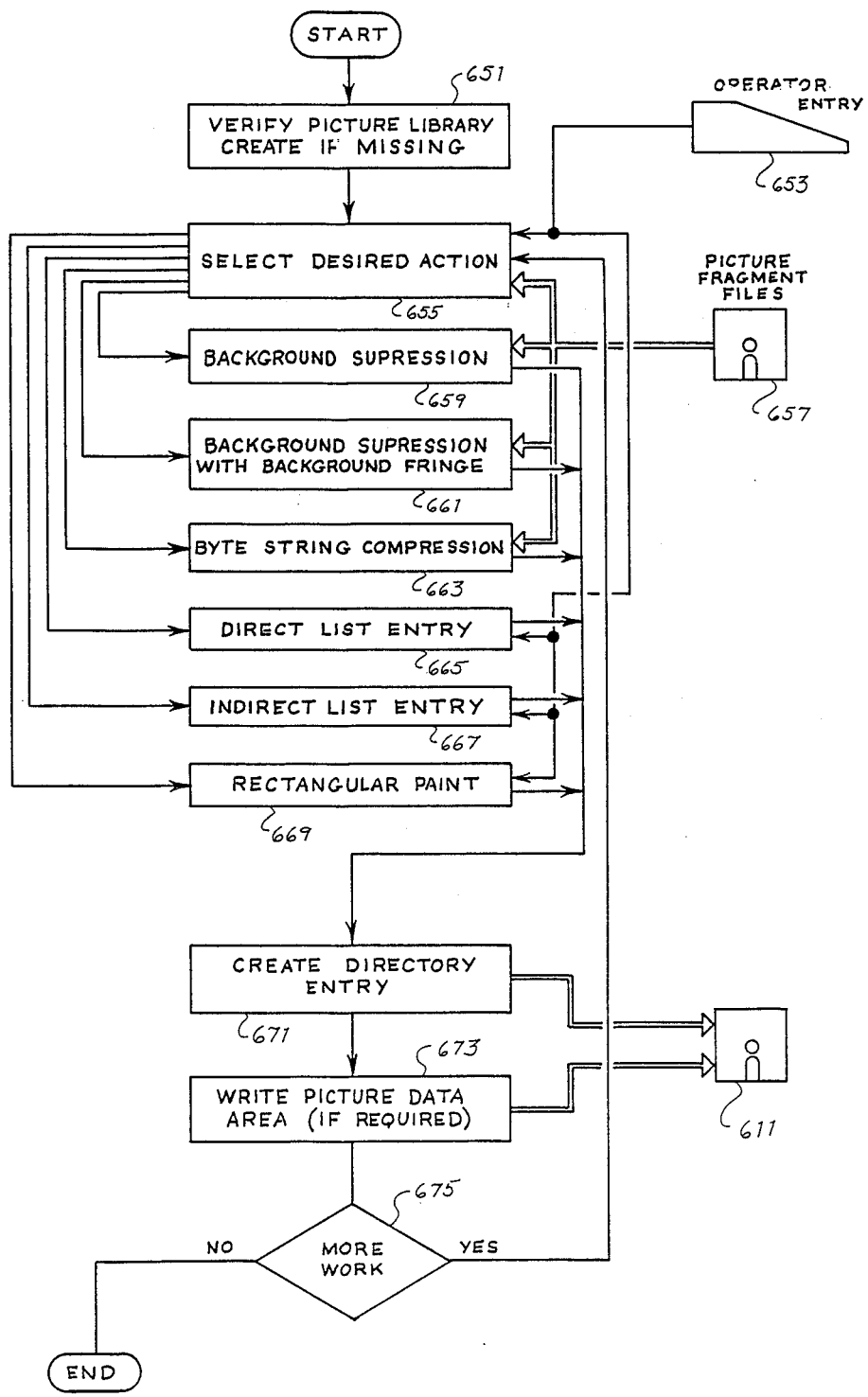
FIG. 11 is a flow diagram showing how an image is compressed according to one aspect of the invention.

Referring now to FIG. 11, the process of compressing the files into the picture library directory and data area structure will be described. The process starts at block 651 where it is determined if a picture library exists and is to be updated or if the picture library does not exist if a new library should be created or alternatively if a mistake was made and the correct disk should be found and inserted. Next at block 655 using both the file names of the picture fragment file(s) from input diskette 657 and keyboard input from the operator through keyboard 653, are used to select the desired build action(s). The file names from 657 indicate both the desired action and the picture ID desired. Files with a name ATMuv.PIC indicate Byte boundary background suppression 659 and an ID of uv, files with a name of ANuvxyXY.PIC indicate byte boundary background suppression with a background fringe, 661, limited by the rectangle with corners of xy and XY, again with a picture ID of uv. Picture fragments with a name of BSCuv.PIC indicate a byte string compression, 663, is desired, and a picture ID of uv. Direct, 665, and indirect, 667, animation lists, and rectangular erase, 673, data types are chosen and entered through the keyboard 653.

Picture fragment binary image files from the picture fragment files 657, are the picture information to be converted to the formats required and described previously, and then used to update the picture library directory and picture library data area in the picture library written onto diskette 611. These update actions are accomplished by blocks 671 and 673 respectively.

When an entry has been made to the picture library, a check is made in decision block 675 to see if there are more picture fragment files or operator specified tasks to be done. If there are none the process is ended. If more tasks exist then processing continues with return to 655.

Picture fragment processing, for example by block 659, byte boundary background suppression, consists of reading the picture fragment from the picture fragment input diskette, 657, into an array in memory. If the input data is not in memory mapped form of the CGA display adapter, then the data must be converted to that form. With memory mapped input it is convenient to merge the odd and even scan line areas during the read in process. With the picture now in merged (line 1, line 2, line 3, . . . ) form in an array of scan line pel image data, the picture processing now starts. This processing consists of evaluating the memory data array to extract the data in the form required by the picture library specification. A description will now be given to illustrate the process.

First the bottom scan line with a non-background pel is located by scanning up from the bottom. This number subtracted from the total lines gives the HEIGHT as required for the picture library directory. Next each line is scanned byte by byte first from the start of the line to the first byte with one or more non-background pels. This gives the value of SKIP required. The scan line is now scanned from the other end again to the byte with a non-background pel. This byte position minus the value of SKIP yields the value of LENGTH. Now a variable length record is created by concatenation of SKIP, LENGTH, and the scanline data starting at SKIP and containing the next LENGTH bytes. As each line of the picture data is scanned in this manner, the longest line length is found and becomes MAXWIDTH. This process continues until all picture image lines have been put into the SKIP,LENGTH,DATA form, then control passes to the processes which write the processed data to the picture library. These processes generate the OFFSET and the picture length values to complete the picture library entry.

CREATION OF ANIMATED GUIDANCE GRAPHICS IMAGES

Creation of animated guidance graphics to guide a user will now be described with reference to FIG. 12. For example, if the user is executing a cash dispense transaction and has entered a desired amount of cash, the machine will respond with the statement "YOU HAVE ENTERED $XX.00". The user will then need to respond by pressing either a YES key or a NO key when asked the further question: "IS THIS AMOUNT CORRECT?".

To guide the user with animation on the base image, the attention of the user will be drawn to the image of the YES and NO keys that appears on the guidance screen. This is accomplished by alternately displaying the keys with a adjacent label or symbol in line drawing and solidly illuminated forms. During repetitions of this cycle, an image of an arm of a person is shown pointing to and about to select and actuate one of the flashing keys. The arm is shown in several sequential positions, moving toward the image of the keys representing the keys of the actual machine from which a selection must be made.

Figure 12A:
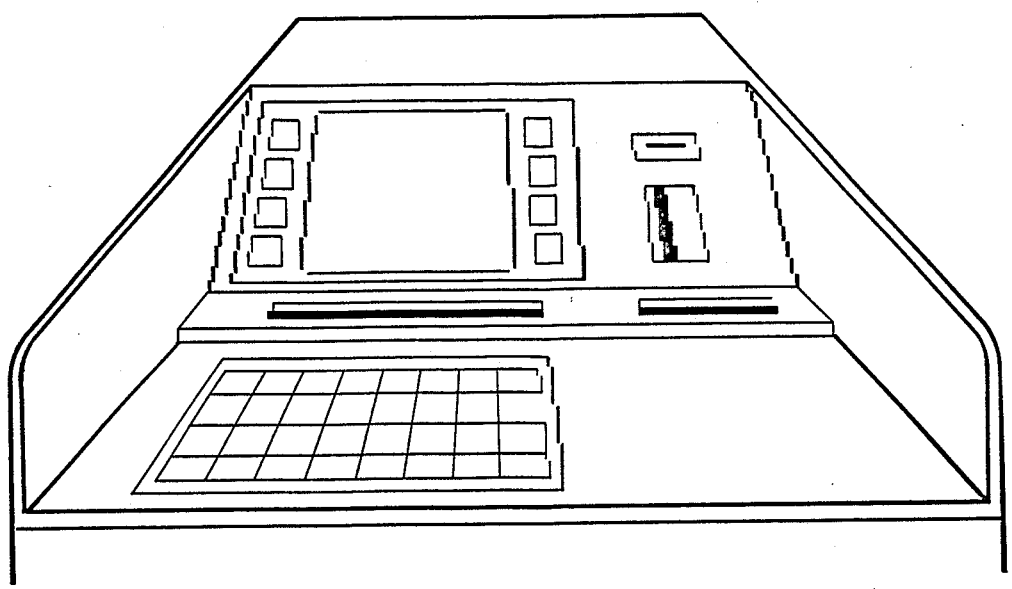
FIG. 12A through FIG. 12G show a number of pictures which are created by an artist for use by the invention to efficiently guide a machine user in the use of the machine.

In FIG. 12A, a base image of FIG. 9 is shown without the character and fragment boundaries. This base image is loaded by an artist into a graphics program from the file saved earlier, and referenced to the upper left corner of the screen as before.

Figure 12B:
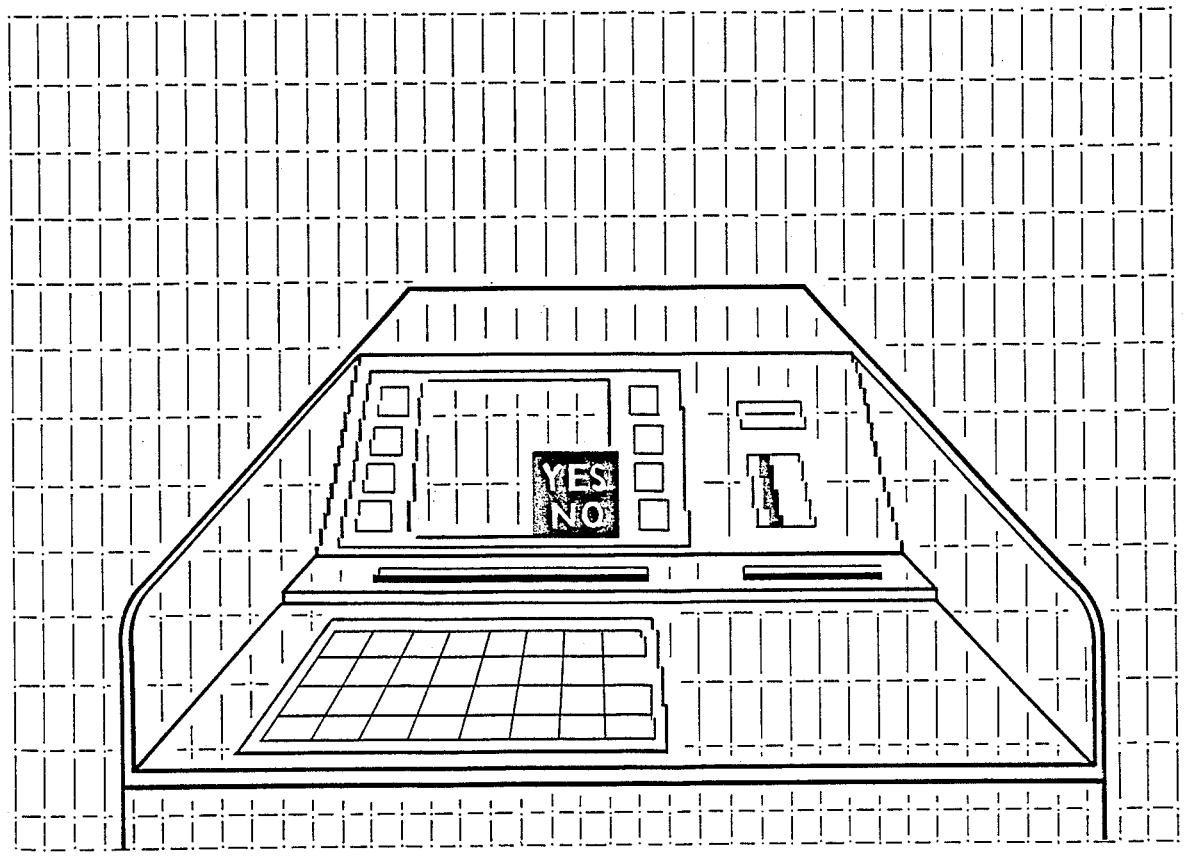

The artist then modifies the image of FIG. 12A to create the image of FIG. 12B. Likewise, FIGS. 12C through 12F are similarly created starting with the picture in FIG. 12A. Actual techniques used by the artist will depend to some extent on the features of the graphics program that the artist is using to create the FIGS. 12B through 12F.

Figure 12C:
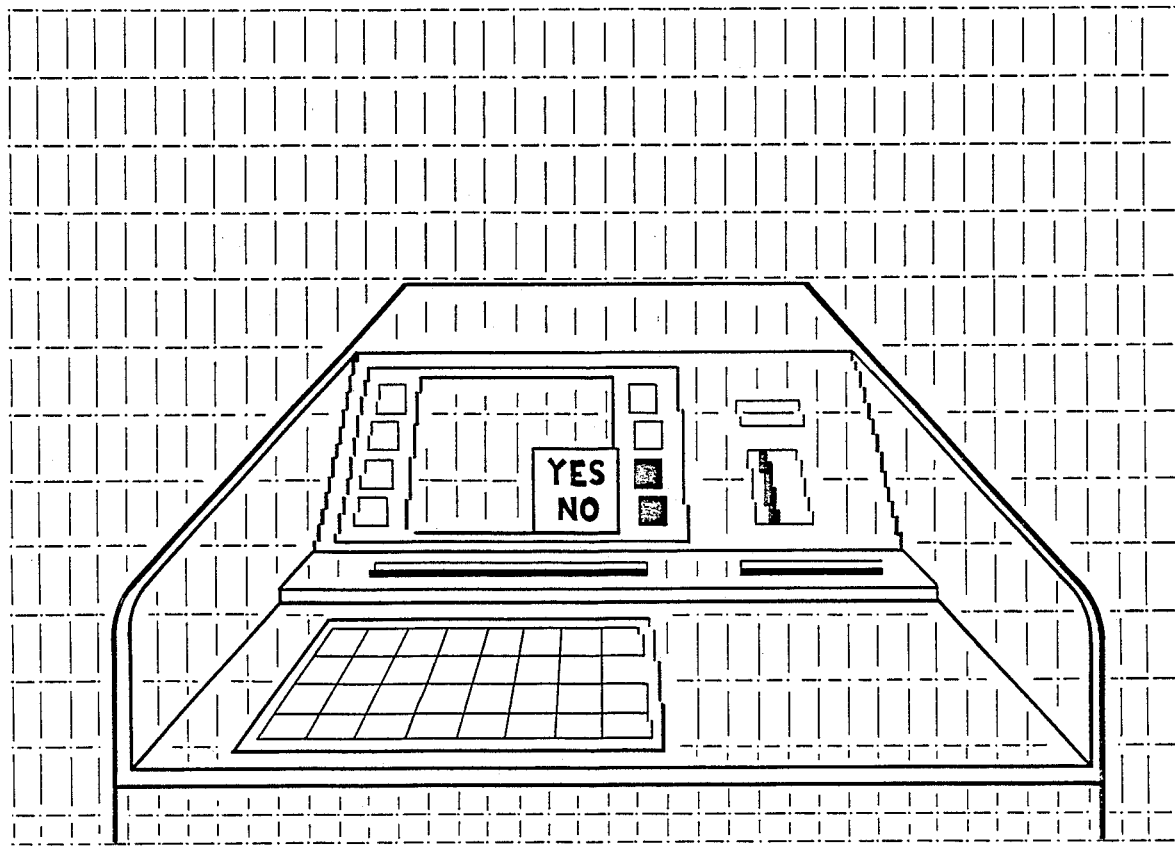
Figure 12D:
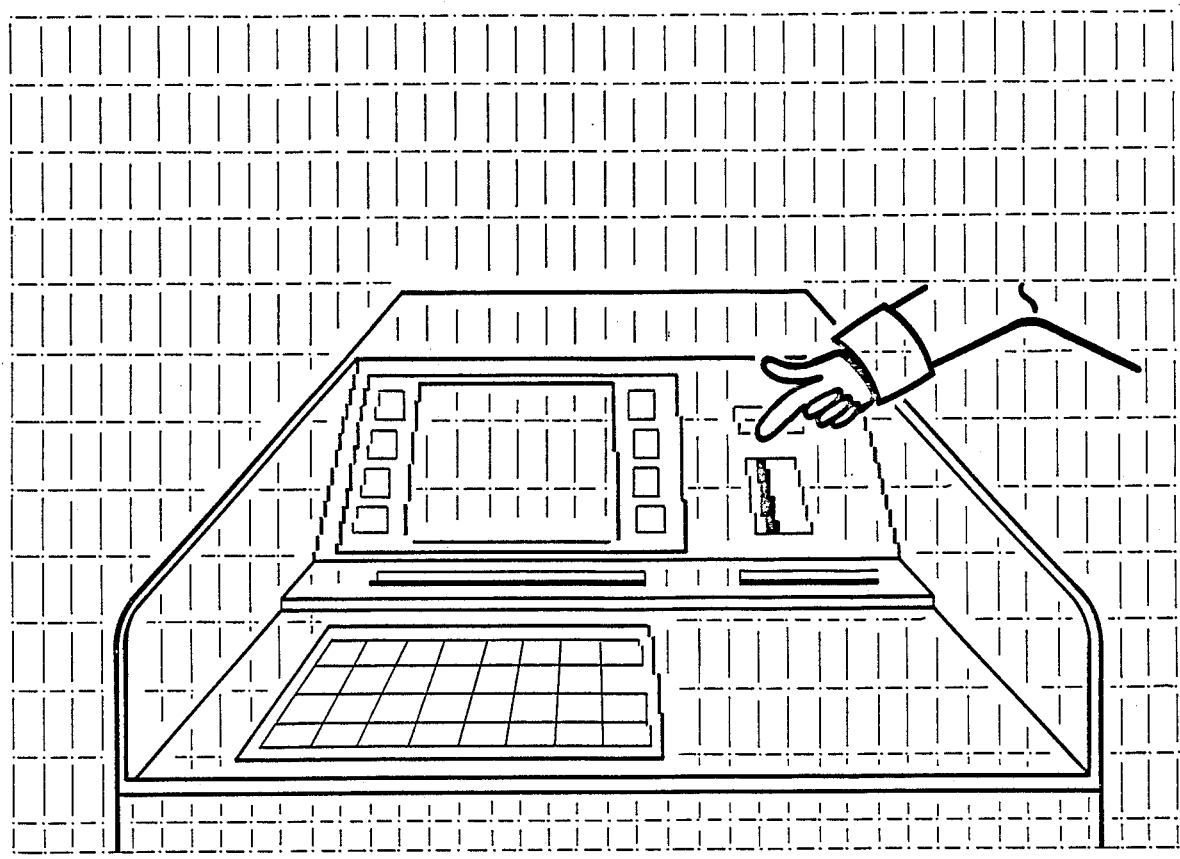
Figure 12E:
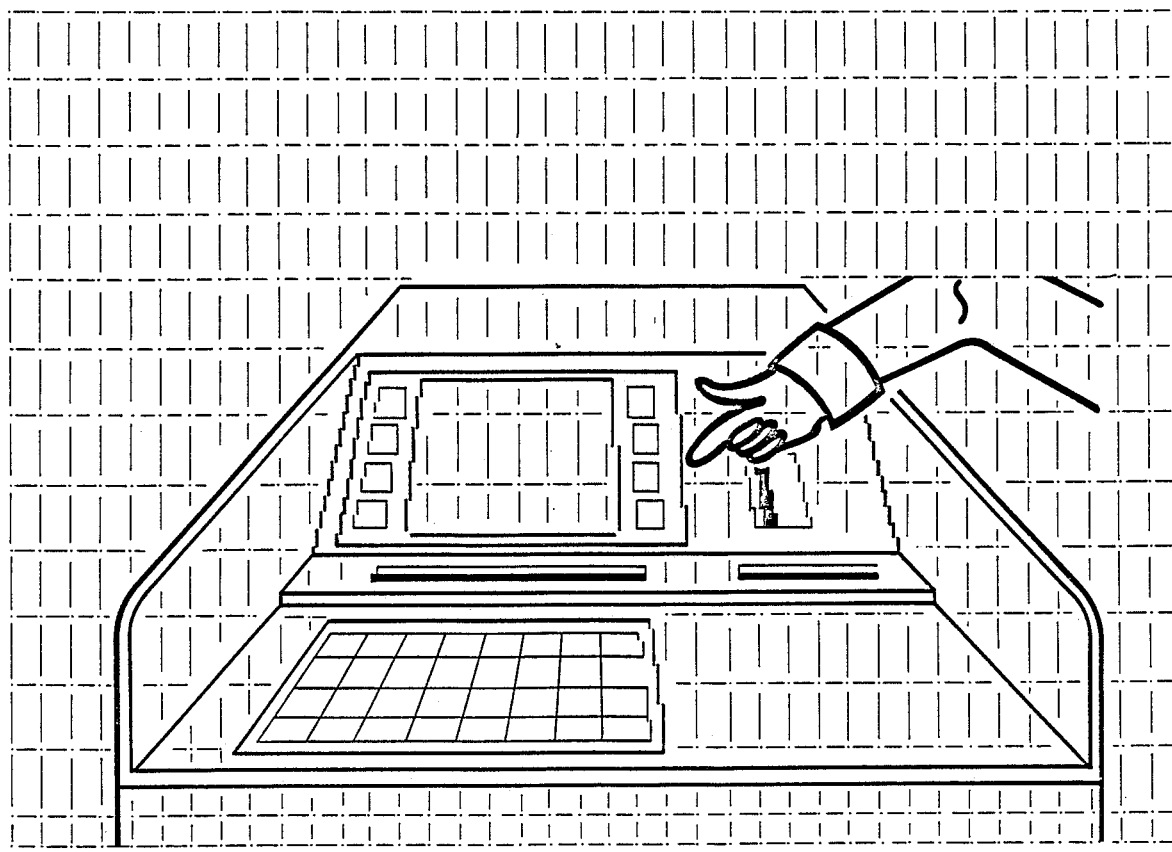
Figure 12F:
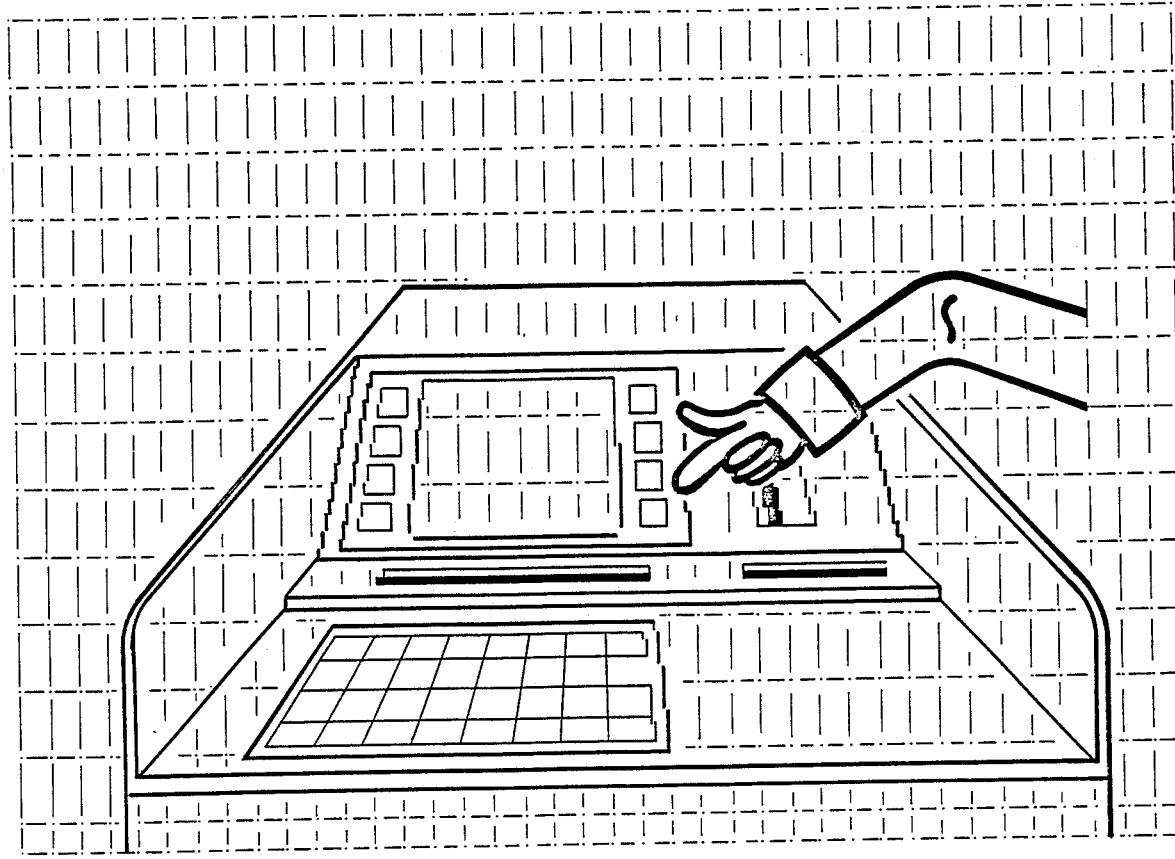
Figure 12G:
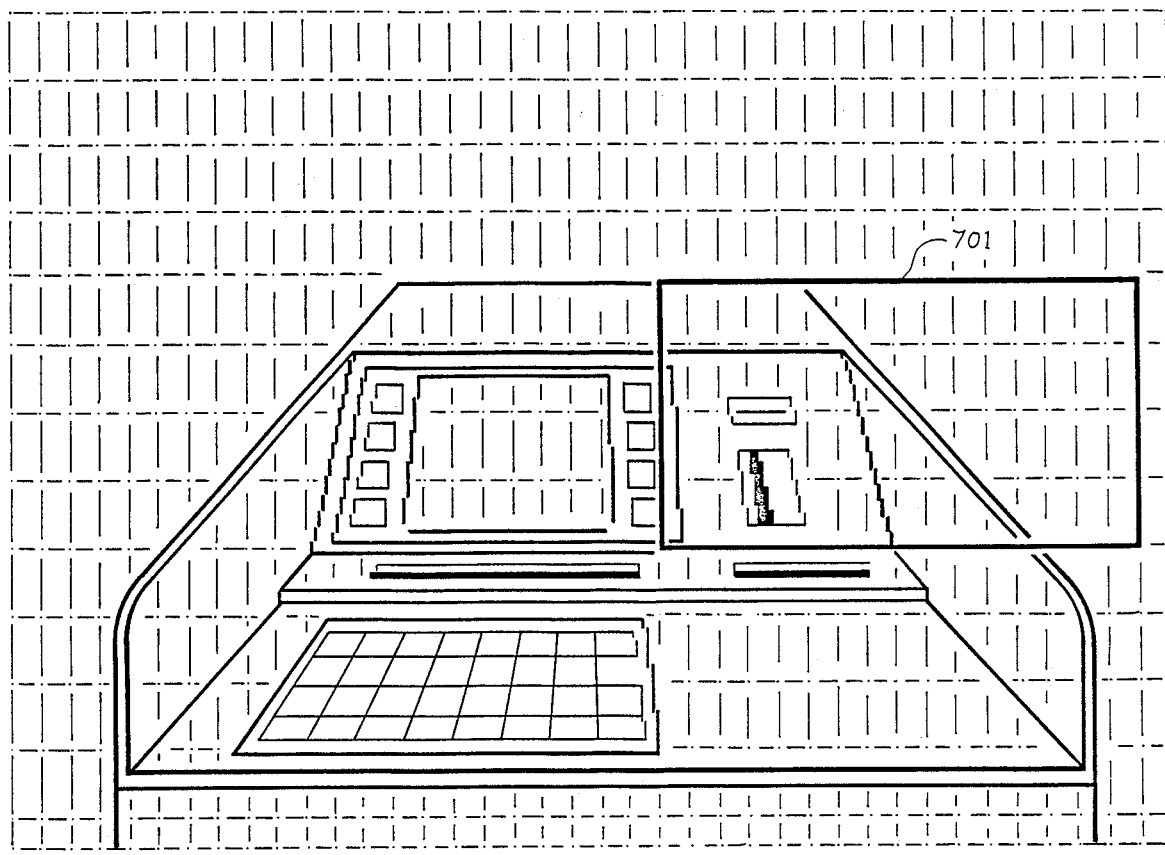
Figure 12H:
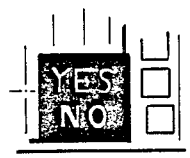
FIG. 12H shows picture fragments from which the base image portions have been removed.
Figure 12H:
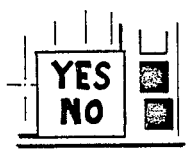
Figure 12H:
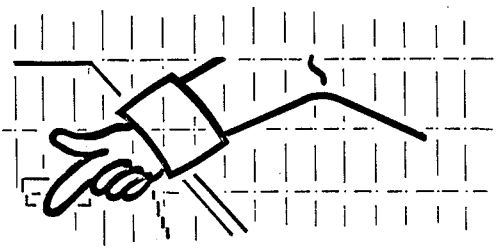
Figure 12H:
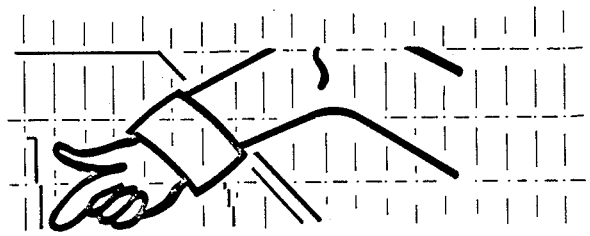
Figure 12H:
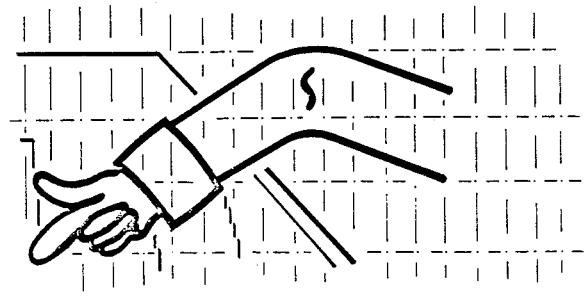
Figure 12:
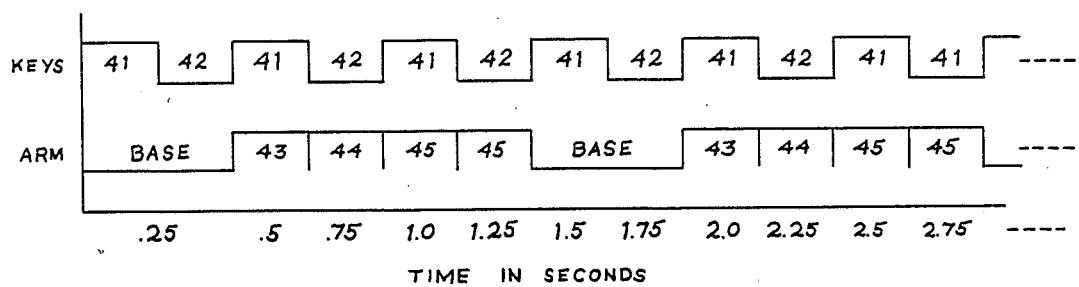
FIG. 12I and 12J are a timing chart and animation list used by the invention to display the fragments of FIG. 12H in animated sequence.

Referring now to FIG. 12H, the next step is to cut picture fragments ID41 and ID42 from FIGS. 12B and 12C. These fragments are both cut along the same boundaries so that they can replace one another without leaving residual image of the previously displayed fragment.

In order to use another feature of the invention, the arm picture fragments ID43, ID44, and ID45, also shown in FIG. 12H, are cut from their respective pictures in FIGS. 12D through 12F. These are not cut on the same boundaries which requires that an erase step and a background reconstruction step be taken before ID43–ID45 are displayed by the machine.

FIG. 12G shows the area 701 defined by rectangular paint picture ID46. FIG. 12I shows a timing chart of the sequence of display and the timing of display of the picture ID41 - ID45 by a transaction machine of the invention. FIG. 12J is the list of direct list members which control the machine to display the picture IDs in the sequence and timing shown in FIG. 12I. After having read the foregoing description of animate with respect to FIG. 5 and FIG. 8, it can be appreciated that the standard character string content causes a graphic control block to be generated to display directory locations A1 and A3. Thereafter, the graphics control block 257 is updated to specify the next directory location as the associated time expires.

While the invention has been described with respect to the preferred embodiment, it will be apparent to those of skill in the art of designing self service transaction machines, that various changes can be made without departing from the spirit and scope of the invention. For example, while the invention has been described as displaying static and animated sequences of graphics images, stored voice information fragments could be substituted or used to supplement the graphics.

What is claimed is:

1. A computer comprising:
   a display buffer and a display screen for displaying to a user on said display screen information stored in said display buffer;
   a processor for receiving a picture library, and a message specification string;
   means in said processor for recognizing a graphic control code in said message specification string as an instruction to interpret the following field as a picture ID code;
   means in said processor for recognizing said picture ID code as an instruction to retrieve from said picture library, records containing information representing a picture, said records each having a skip field, a length field, and a data field;
   means in said processor for processing a count in said skip field to determine where on said display screen said picture is to be displayed.

2. A computer as in claim 1 wherein said means in said processor for recognizing said picture ID first retrieves from said picture library, a directory record, said directory record having a height field and an offset field, said height field containing a count of a number of picture data records comprising said picture to be displayed and said offset field containing a relative address of a first of said data records, each of said data record having said skip field, said length field, and said data field.

3. A computer comprising:
   a user interface for receiving input from a user in response to guidance conveyed to said user by a display screen in said interface;
   a processor for reading from an external source, a picture library, and a message specification string having text codes, a graphic control code and a picture ID code;
   means in said processor for recognizing said text codes in said message specification string as instructions to move text character font information to a display buffer;
   means in said processor for recognizing said graphic control code as an instruction to interpret a following field as a display screen position and a next following field as a picture ID code;
   means in said processor for recognizing said picture ID code as an instruction to retrieve from said picture library, records containing information representing a picture, said records each having a skip field, a length field, and a variable length data field;
   means in said processor for adding a count in said display screen position field to a count in said skip field to determine where on said display screen said variable length data is to e displayed.

4. A computer comprising:
   a display buffer and a display screen for displaying to a user on said display screen, information stored in said display buffer;
   a processor for receiving a picture library, and a message specification string having a graphic control code and a picture ID code;

means in said processor for recognizing said graphic control code as an instruction to interpret a following field as a picture ID code;

means in said processor for recognizing said picture ID code as an instruction to retrieve from said picture library, a directory record, said directly record containing information representing a sequence of pictures, said directory record having: a field containing a show picture ID code, and another field containing a next picture ID code of a next picture of said sequence of pictures;

means in said processor for recognizing said show picture ID code as an instruction to retrieve from said picture library, a directory record, said directory record having a height field and an offset field, said height field containing a count of a number of picture data records comprising said picture to be shown and said offset field containing a relative address of a first of said data records, each of said data records having a skip field, a length field, and a data field;

means in said processor for using a count in said skip field to determine for each data record, where on said display screen, data in said data field is to be displayed;

means in said processor for recognizing said next picture ID code as an instruction to retrieve from said picture library, another directory record, said another directory record comprising a next show picture ID code, said means in said processor for recognizing said show picture ID code also recognizing said next show picture ID code as an instruction to retrieve from said picture library, a directory record, said directory record having a height field and an offset field, said height field containing a count of a number of picture data records comprising said next picture to be shown and said offset field containing a relative address of a first of said data records, each of said data records having a skip field, a length field, and a data field.

5. A workstation having a display screen and a keyboard controlled by a computer having a string move instruction, said workstation further comprising:
a picture library having a plurality of variable length string records;
a first field of each of said records being a count of a number of picture elements to be skipped before starting to display picture elements;
a second field of each of said records being a count of a number of picture elements to be displayed;
a third field of each of said records being a string of binary bits equal in number to said count in said second field, each of said binary bits storing a state of a picture element to be displayed;
said computer being programmed to move said string of binary bits from said picture library to display buffer with one string move instruction.

6. A self-service transaction machine comprising:
a display and switches for interaction with a user;
apparatus for issuing items and information to said user;
and a computer for controlling the operation of said machine, said machine communicating with a host computer by means of a message string having escape codes, text codes, and data, said computer further comprising:
programmed instructions responsive to said text codes in said message string for moving text character font information to a display buffer;
programmed instructions responsive to interpret an escape code as a graphics control code and to interpret a following code as a picture ID code;
programmed instructions responsive to said picture ID code for retrieving records containing information representing a picture, said records each having a skip field, a length field and a data field;
programmed instructions for moving an amount of data specified in said length field of each of said records from said data field of each of said records to said display buffer at a location defined by a value in said skip field of each of said records;
means for displaying said information in said display buffer;
programmed instructions responsive to information entered at said keyboard by said user in response to said text and picture information displayed on said display to execute a step of a transaction.

7. The self-service transaction machine of claim 6 wherein:
said programmed instructions responsive to said picture ID code further comprise: programmed instructions for recognizing said picture ID code as an instruction to retrieve from said picture library, a directory record, said directory record containing information representing a sequence of pictures, said directory record having: a field containing a show picture ID code, and another field containing a next picture ID code;
said programmed instructions responsive to said picture ID code for retrieving records containing information representing a picture further comprise: programmed instructions for recognizing said show picture ID code as an instruction to retrieve from said picture library, a directory record, said directory record having a height field and an offset field, said height field containing a count of a number of picture data records comprising said picture to be shown and said offset field containing a relative address of a first of said data records, each of said data records having a skip field, a length field, and a data field;
said self-service transaction machine of claim 11 still further comprising: programmed instructions for recognizing said next picture ID code as an instruction to retrieve from said picture library, another directory record, said another directory record comprising a next show picture ID code, said means in said processor for recognizing said show picture ID code also recognizing said next show picture ID code as an instruction to retrieve from said picture library, a directory record, said directory record having a height field and an offset field, said height field containing a count of number of picture data records comprising a next picture to be shown and said offset field containing a relative address of a first of said data records, each of said data records having a skip field, a length field, and a data field.

8. The transaction machine of claim 7 wherein:
said picture to be shown is a picture of a user's console of said transaction machine including an image of said switches;
said next picture to be shown is a picture of a hand indicating, with respect to said switches, an action to be taken by said user 9. The transaction machine of claim 7 wherein:
said picture to be shown is a picture of a hand indicating, with respect to said switches, an action to be taken by said user;
said next picture to be shown in another picture of said hand in a different position.

* * * * *

UNITED STATES PATENT AND TRADEMARK OFFICE
CERTIFICATE OF CORRECTION

PATENT NO.   :   4,884,199

DATED        :   November 28, 1989

INVENTOR(S)  :   William A. Boothroyd et al.

It is certified that error appears in the above-identified patent and that said Letters Patent is hereby corrected as shown below:

Claim 4, col. 21, line 6:  Change --directly-- to directory

Claim 7, col. 22, line 40: Change --claim 11-- to claim 6

Signed and Sealed this

Nineteenth Day of February, 1991

Attest:

HARRY F. MANBECK, JR.

Attesting Officer                Commissioner of Patents and Trademarks